United States Patent
Ortiz et al.

(10) Patent No.: US 9,747,608 B2
(45) Date of Patent: Aug. 29, 2017

(54) THIRD-PARTY PROVIDER METHOD AND SYSTEM

(75) Inventors: Luis M. Ortiz, Dallas, TX (US); Kermit D. Lopez, Dallas, TX (US)

(73) Assignee: Rateze Remote Mgmt LLC, Wilmington, DE (US)

( * ) Notice: Subject to any disclaimer, the term of this patent is extended or adjusted under 35 U.S.C. 154(b) by 1226 days.

(21) Appl. No.: 13/427,310

(22) Filed: Mar. 22, 2012

(65) Prior Publication Data
US 2012/0179528 A1    Jul. 12, 2012

Related U.S. Application Data

(60) Continuation of application No. 13/082,243, filed on Apr. 7, 2011, now Pat. No. 8,175,519, which is a
(Continued)

(51) Int. Cl.
*G06Q 20/10* (2012.01)
*G06Q 30/02* (2012.01)
(Continued)

(52) U.S. Cl.
CPC ............. *G06Q 30/02* (2013.01); *G06Q 20/10* (2013.01); *G06Q 20/105* (2013.01);
(Continued)

(58) Field of Classification Search
CPC ......... G06Q 30/02222; G06Q 30/0239; G06Q 30/0242
USPC ..... 705/14.23, 27.2, 39, 41, 43, 14.35, 26.1, 705/37, 406, 412.1; 455/412.1, 414.3, 455/414.1; 235/379, 381, 383
See application file for complete search history.

(56) References Cited

U.S. PATENT DOCUMENTS

| 4,689,478 A | 8/1987 | Hale et al. |
| 4,799,156 A | 1/1989 | Shavit et al. |

(Continued)

FOREIGN PATENT DOCUMENTS

WO    WO98/19229    5/1998

OTHER PUBLICATIONS

Ortiz et al., U.S. Appl. No. 60/238,568, filed Oct. 6, 2000.
(Continued)

*Primary Examiner* — Andrew Joseph Rudy
(74) *Attorney, Agent, or Firm* — Meyertons, Hood, Kivlin, Kowert & Goetzel, P.C.

(57) ABSTRACT

Methods and systems for processing negotiable economic credits through, or at the request of, a hand held device in association with a third-party provider communicative with the hand held device and/or a point of sale. At least one negotiable economic credit can be transferred from a third-party provider communicative with the hand held device to the hand held device and/or point of sale. The negotiable economic credit can be stored within a memory of the hand held device and/or point of sale for retrieval and processing at a point of sale associated with a retail establishment and/or by a hand held device. The negotiable economic credit can be associated with a security module for protecting the privacy of the negotiable economic credit. A user profile can be compiled for utilization during the retrieval of the negotiable economic credit.

21 Claims, 32 Drawing Sheets

Related U.S. Application Data division of application No. 09/962,675, filed on Sep. 25, 2001, now Pat. No. 7,979,057.

(60) Provisional application No. 60/238,568, filed on Oct. 6, 2000.

(51) Int. Cl.
*G06Q 20/36* (2012.01)
*G06Q 20/40* (2012.01)

(52) U.S. Cl.
CPC ....... *G06Q 20/3674* (2013.01); *G06Q 20/401* (2013.01); *G06Q 30/0207* (2013.01); *G06Q 30/0222* (2013.01); *G06Q 30/0238* (2013.01); *G06Q 30/0267* (2013.01); *G06Q 30/0269* (2013.01)

(56) References Cited

U.S. PATENT DOCUMENTS

| | | | |
|---|---|---|---|
| 5,192,854 | A | 3/1993 | Counts |
| 5,380,991 | A | 1/1995 | Valencia et al. |
| 5,420,606 | A | 5/1995 | Begum et al. |
| 5,553,192 | A | 9/1996 | Hayata |
| 5,621,797 | A | 4/1997 | Rosen |
| 5,703,564 | A | 12/1997 | Begum et al. |
| 5,727,153 | A | 3/1998 | Powell |
| 5,761,648 | A | 6/1998 | Golden et al. |
| 5,796,832 | A | 8/1998 | Kawan |
| 5,806,044 | A | 9/1998 | Powell |
| 5,806,045 | A | 9/1998 | Biorge et al. |
| 5,822,735 | A | 10/1998 | De Lapa et al. |
| 5,845,259 | A | 12/1998 | West et al. |
| 5,855,007 | A | 12/1998 | Jovicic et al. |
| 5,859,779 | A | 1/1999 | Giordano et al. |
| 5,870,030 | A | 2/1999 | DeLuca et al. |
| 5,887,266 | A | 3/1999 | Heinonen et al. |
| 5,890,052 | A | 3/1999 | Read et al. |
| 5,933,785 | A | 8/1999 | Tayloe |
| 5,933,812 | A | 8/1999 | Meyer et al. |
| 5,943,624 | A | 8/1999 | Fox et al. |
| 5,956,694 | A | 9/1999 | Powell |
| 5,970,469 | A | 10/1999 | Scroggie et al. |
| 6,012,038 | A | 1/2000 | Powell |
| 6,012,244 | A | 1/2000 | Begum et al. |
| 6,014,634 | A | 1/2000 | Scroggie et al. |
| 6,035,280 | A | 3/2000 | Christensen |
| 6,041,309 | A | 3/2000 | Laor |
| 6,055,229 | A | 4/2000 | Dorenbosch et al. |
| 6,057,872 | A | 5/2000 | Candelore |
| 6,067,526 | A | 5/2000 | Powell |
| 6,076,068 | A | 6/2000 | De Lapa et al. |
| 6,076,069 | A | 6/2000 | Laor |
| 6,078,806 | A | 6/2000 | Heinonen et al. |
| 6,088,730 | A | 7/2000 | Kato et al. |
| 6,101,562 | A | 8/2000 | Chang et al. |
| 6,105,002 | A | 8/2000 | Powell |
| 6,105,864 | A | 8/2000 | Shiobara et al. |
| 6,129,274 | A * | 10/2000 | Suzuki ............... 235/381 |
| 6,175,922 | B1 | 1/2001 | Wang |
| 6,185,545 | B1 | 2/2001 | Resnick et al. |
| 6,206,283 | B1 | 3/2001 | Bansal et al. |
| 6,282,516 | B1 | 8/2001 | Giuliani |
| 6,311,171 | B1 | 10/2001 | Dent |
| 6,332,127 | B1 | 12/2001 | Bandera et al. |
| 6,332,128 | B1 | 12/2001 | Nicholson |
| 6,363,488 | B1 | 3/2002 | Ginter et al. |
| 6,385,591 | B1 | 5/2002 | Mankoff |
| 6,394,341 | B1 | 5/2002 | Makipaa et al. |
| 6,425,524 | B2 | 7/2002 | Pentel |
| 6,434,159 | B1 | 8/2002 | Woodward et al. |
| 6,434,398 | B1 | 8/2002 | Inselberg |
| 6,435,406 | B1 | 8/2002 | Pentel |
| 6,450,407 | B1 | 9/2002 | Freeman et al. |
| 6,467,685 | B1 | 10/2002 | Teicher |
| 6,467,686 | B1 | 10/2002 | Guthrie et al. |
| 6,491,217 | B2 | 12/2002 | Catan |
| 6,496,857 | B1 | 12/2002 | Dustin et al. |
| 6,505,773 | B1 | 1/2003 | Palmer et al. |
| 6,519,571 | B1 | 2/2003 | Guheen et al. |
| 6,522,875 | B1 | 2/2003 | Dowling et al. |
| 6,554,184 | B1 | 4/2003 | Amos |
| 6,580,914 | B1 | 6/2003 | Smith |
| 6,604,086 | B1 | 8/2003 | Kolls |
| 6,611,881 | B1 | 8/2003 | Gottfurcht et al. |
| 6,629,080 | B1 | 9/2003 | Kolls |
| 6,736,322 | B2 | 5/2004 | Gobburu et al. |
| 6,763,336 | B1 | 7/2004 | Kolls |
| 6,771,981 | B1 | 8/2004 | Zalewski et al. |
| 6,839,684 | B1 | 1/2005 | Rissanen et al. |
| 6,846,238 | B2 | 1/2005 | Wells |
| 6,877,661 | B2 | 4/2005 | Webb et al. |
| 6,884,162 | B2 | 4/2005 | Raverdy et al. |
| 6,892,180 | B1 * | 5/2005 | Pointeau et al. ........... 705/14.35 |
| 6,920,431 | B2 | 7/2005 | Showghi et al. |
| 6,932,270 | B1 * | 8/2005 | Fajkowski ................ 235/383 |
| 6,934,532 | B2 * | 8/2005 | Coppinger et al. ........ 455/412.1 |
| 6,935,952 | B2 | 8/2005 | Walker et al. |
| 6,945,457 | B1 | 9/2005 | Barcelou |
| 6,975,856 | B2 | 12/2005 | Ogasawara |
| 6,985,452 | B2 | 1/2006 | Marshall et al. |
| 6,996,216 | B2 | 2/2006 | Brown et al. |
| 6,997,378 | B2 * | 2/2006 | Phillips et al. ............... 235/379 |
| 6,999,936 | B2 | 2/2006 | Sehr |
| 7,010,498 | B1 * | 3/2006 | Berstis ...................... 705/14.38 |
| 7,013,290 | B2 | 3/2006 | Ananian |
| 7,014,106 | B2 | 3/2006 | Nakajima |
| 7,030,732 | B2 | 4/2006 | Tuttle |
| 7,089,208 | B1 | 8/2006 | Levchin et al. |
| 7,110,744 | B2 | 9/2006 | Freeny, Jr. |
| 7,123,915 | B1 | 10/2006 | Cook |
| 7,133,659 | B2 | 11/2006 | Zalewski et al. |
| 7,155,199 | B2 | 12/2006 | Zalewski et al. |
| 7,165,041 | B1 | 1/2007 | Guheen et al. |
| 7,209,733 | B2 | 4/2007 | Ortiz et al. |
| 7,257,545 | B1 | 8/2007 | Hung |
| 7,292,844 | B2 | 11/2007 | Dowling et al. |
| 7,292,996 | B2 * | 11/2007 | Nobrega et al. ................ 705/39 |
| 7,308,254 | B1 | 12/2007 | Rissanen |
| 7,315,826 | B1 | 1/2008 | Guheen et al. |
| 7,376,583 | B1 | 5/2008 | Rolf |
| 7,386,322 | B2 | 6/2008 | Sainton et al. |
| 7,415,424 | B1 | 8/2008 | Donner |
| 7,418,427 | B1 * | 8/2008 | Drummond et al. ........... 705/43 |
| 7,424,617 | B2 | 9/2008 | Boyd et al. |
| 7,430,540 | B1 * | 9/2008 | Asani ................... G06Q 20/02 705/41 |
| 7,457,608 | B2 | 11/2008 | Shah |
| 7,499,717 | B2 | 3/2009 | Arazi et al. |
| 7,599,850 | B1 | 10/2009 | Laor |
| 7,621,444 | B2 | 11/2009 | Barcelou |
| 7,660,772 | B2 | 2/2010 | Verkama |
| 7,689,510 | B2 | 3/2010 | Lamkin et al. |
| 7,693,101 | B2 | 4/2010 | Gernert et al. |
| 7,711,100 | B2 | 5/2010 | Dennis |
| 7,797,005 | B2 | 9/2010 | Inselberg |
| 7,813,716 | B2 | 10/2010 | Malackowski et al. |
| 7,860,450 | B2 | 12/2010 | Rissanen |
| 7,870,021 | B2 | 1/2011 | Mankoff |
| 7,979,057 | B2 | 7/2011 | Ortiz et al. |
| 8,016,189 | B2 | 9/2011 | Wang et al. |
| 8,025,224 | B2 | 9/2011 | Fajkowski |
| 8,036,934 | B2 | 10/2011 | Mankoff |
| 8,068,781 | B2 | 11/2011 | Ilan et al. |
| 8,078,506 | B1 * | 12/2011 | Rao et al. ..................... 705/27.2 |
| RE44,513 | E * | 10/2013 | Nobrega et al. ................ 705/39 |
| 8,583,504 | B2 * | 11/2013 | Hirson et al. ................. 705/26.1 |
| 8,706,627 | B2 * | 4/2014 | Shore ............................ 705/41 |
| 8,930,260 | B2 * | 1/2015 | Pappas et al. .................. 705/37 |
| 2002/0042743 | A1 | 4/2002 | Ortiz et al. |
| 2002/0042753 | A1 | 4/2002 | Ortiz et al. |
| 2004/0143500 | A1 | 7/2004 | Lopez et al. |

(56) References Cited

U.S. PATENT DOCUMENTS

| | | |
|---|---|---|
| 2004/0143501 A1 | 7/2004 | Lopez et al. |
| 2004/0158492 A1 | 8/2004 | Lopez et al. |
| 2004/0193499 A1 | 9/2004 | Ortiz et al. |

OTHER PUBLICATIONS

Ortiz et al., U.S. Appl. No. 60/238,590, filed Oct. 6, 2000.
Ortiz et al., U.S. Appl. No. 60/238,593, filed Oct. 6, 2000.
Lopez et al., U.S. Appl. No. 09/684,737, filed Oct. 6, 2000.
Cosanato et al., "Gartner's 2000 Glossary of Mobile and Wireless Terms", Strategic Analysis Report, Gartner Group, Inc., Sep. 7, 2000, 26 pages.
Coyle, "Opinion: Web on Wireless is Different", Wireless Week, Jul. 17, 2000, 3 pages.
Daswani et al, "SWAPEROO: A Simple Wallet Architecture for Payments, Exchanges, Refunds, and Other Operations", Proceedings of the 3rd USENIX Workshop on Electronic Commerce, Boston MA, Aug. 31-Sep. 3, 1998, 20 pages.
De Bendern, "Handspring's U.S. Users to Get Phone on Palmtop", Reuters, Sep. 25, 2000, 2 pages.
DECT Forum, "DECT: The Standard Explained", DECT Forum, Feb. 1997, 16 pages.
Dziatkiewicz, "Entering the WAP Gateway", Wireless Week, Sep. 4, 2000, 4 pages.
Dziatkiewicz, "Competing for Access", Wireless Week, Jul. 17, 2000, 5 pages.
Edwards, "Hush Money", Wireless Week, May 15, 2000, 3 pages.
Edwards, "The M-Tailing Mirage", Wireless Week, Jul. 17, 2000, 3 pages.
Galatowitsch, "The Coveted Return on Investment", Wireless Week, Jul. 17, 2000, 4 pages.
Gurr, "The Smart Card Way to Cut Back", Onine Athens: News, Athens Daily News, Jul. 25, 1999, 3 pages.
Microsoft Press, "Microsoft Press Computer Dictionary", Third Edition, p. 510, "wireless".
Mendez-Wilson, "Advanced Messaging Carriers: Finding Alternative Routes", Wireless Week, Jul. 17, 2000, 4 pages.
News Corporation, Press Release "News America Marketing Takes Consumer Marketing to Next Generation through Strategic Partnerships with Integrated Marketing and E-Commerce Firms", Jul. 20, 1999, 1 page.
oneclip.com, Press Release "Oneclip.com Partners with MyWebGrocer.com", Aug. 8, 2000, 1 page.
oneclip.com, Press Release "Oneclip.com Spurs 400% Sales Increases at More.com", Sep. 11, 2000, 2 pages.
Quigley, "Getting into the i-Mode: DoCoMo's Plan for Content", Wireless Week, Jan. 31, 2000, 3 pages.
Regan, "Visa Unveils Wireless Bill Payment Partnership," E-Commerce Times, May 4, 2000, 2 pages.
Reuters, "Motorola Unveils Next-Generation Phones", Sep. 27, 2000, 2 pages.
Singh, "Securing the Mobile E-conomy", Wireless Week, May 15, 2000, 2 pages.
Smith, "Catching Up with the Speed of Light", Wireless Week, Jan. 31, 2000, 4 pages.
Smith, "A Mobile Internet Business Model: Dizzying Heights and Hurdles", Wireless Week, Jan. 31, 2000, 1 page.
Smith, "What's Next for WAP?", Wireless Week, May 15, 2000, 3 pages.
Smith, "Wingin' It: Venturing into Unknown Territory, WASPs are Defining their Market on the Fly", Wireless Week, Jul. 17, 2000, 3 pages.
Spenzis et al, "Unstrung: The Birth of the Wireless Internet", CIBC World Markets Equity Research, Oct. 4, 2000, 140 pages.
Zimmerman, "Wireless Networked Digital Devices: A New Paradigm for Computing and Communication", IBM Systems Journal, vol. 38, No. 4, 1999, pp. 566-574.
Non-Final Office Action on U.S. Appl. No. 09/962,675, mailed Apr. 3, 2006.
Final Office Action on U.S. Appl. No. 09/962,675, mailed Oct. 20, 2006.
Non-Final Office Action on U.S. Appl. No. 09/962,675, mailed Nov. 27, 2007.
Non-Final Office Action on U.S. Appl. No. 09/962,675, mailed Dec. 21, 2007.
Final Office Action on U.S. Appl. No. 09/962,675, mailed May 5, 2008.
Notice of Allowance on U.S. Appl. No. 09/962,675, mailed Jan. 25, 2011.
Non-Final Office Action on U.S. Appl. No. 09/962,675, mailed Nov. 3, 2010.
Notice of Allowance in U.S. Appl. No. 13/082,243 mailed Jan. 9, 2012, 7 pages.

\* cited by examiner

THIRD-PARTY PROVIDER METHOD AND SYSTEM

CROSS-REFERENCE TO RELATED PATENT APPLICATIONS

This application is a continuation of U.S. application Ser. No. 13/082,243, filed Apr. 7, 2011 know U.S. Pat. No. 8,175,519), which is a divisional of U.S. application Ser. No. 09/962,675, filed Sep. 25, 2001 (now U.S. Pat. No. 7,979,057), which is a non-provisional application of Provisional Application U.S. Application 60/238,568, filed Oct. 6, 2000, all of which are incorporated herein by reference in their entireties.

BACKGROUND

1. Technical Field

The present disclosure is generally related to electronic hand held devices (hereinafter referred to as "hand held devices") and electronic commerce ("E-commerce"). The present invention is also related to hand held devices, such as a Personal Digital Assistant (PDA), wireless telephone, pager, or other mobile computing and storage device adapted for use in E-commerce. The present invention is also related to wireless and wireline computer networks. The present invention is additionally related to the fields of electronic cash, credit, award, incentive, and/or product management usable with/for retail establishments, organizations, and customers. The present invention is also related to merchandising systems and systems for generating and redeeming negotiable economic credits and/or data (e.g., electroin product discount coupons and other negotiable economic credits, such as enterprise awards, cash, credit, etc.).

2. Description of the Related Art

The recent shift in the consumer electronics industry from an emphasis on analog technology to a preference for digital technology is largely based on the fact that the former generally limits the user to a role of a passive recipient of information, while the latter is interactive and allows the user to control what, when, and how he or she receives and manipulates certain information.

This shift in focus has resulted in the development and increasingly widespread use of, for example, a hand held digital device generically referred to as a "personal digital assistant" (PDA). These hand held devices are becoming increasingly popular for storing and maintaining information. Hand held devices, such as PDAs, may be connected to a desktop personal computer, networks or other PDAs via infrared, direct wire, or wireless communication links.

Unlike personal computers, which are general-purpose devices geared toward refining and processing information, PDAs are designed to capture, store and display information originating from various sources. Additionally, while a certain level of skill is required to use a personal computer effectively, hand held devices, such as PDAs, are designed with the novice and non-computer user in mind.

A typical PDA includes a microprocessor, a memory unit, a display, associated encoder circuitry, and selector buttons. It may optionally contain a clock and infrared emitter and receiver. A graphical user interface permits a user to store, retrieve and manipulate data via an interactive display. A PDA also typically includes a calendar, datebook, and one or more directories. The calendar shows a month of dates organized as rows and columns in the usual form. The datebook shows one day at a time and contains alphanumeric text entered in free format (typically, with a time of day and an event and/or name). Each directory contains entries consisting of a name field and a free form alphanumeric text field that can contain company names, addresses, telephone and fax numbers, email addresses, etc.

Entries may be organized alphabetically according to the name field and can be scanned or searched for by specifying a specific sequence of characters in the name field. A menu displayed via the graphical user interface permits a user to choose particular functions and directories. Most PDAs come equipped with a stylus, which is a plastic-tipped pen that a user utilizes to write in a "graffiti area" of the display and tap particular graphically displayed icons. Each icon is indicative of a particular activity or function.

PDAs are increasingly being utilized to access information from remote computer networks, such as the "World Wide Web" and the "Internet," both terms well known in the computer networking arts. PDA users can, for example, download e-mail from the Internet to the PDA. Web sites also exist that permit PDA users to access and download software that may be run on the PDA. For example, some web sites offer information to PDAs in the form of compressed news articles, stock quotes, and other data obtained from a wide variety of other electronic web-based sources.

Based on the foregoing, it can be appreciated that a large number of users of hand held devices, such as PDAs, pagers and mobile telephony are increasingly relying on such devices to maintain and transmit a variety of personal and business information.

Discount coupons have long been distributed by manufacturers to merchandise their products and by retail stores or establishments to attract consumers to their particular stores. Discount coupons are a type of negotiable economic credit frequently utilized by enterprises for marketing products and services to the public. Enterprise awards, such as frequent flyer miles, are also negotiable economic credits relied upon by enterprises for marketing purposes.

Coupons are typically distributed to attract customers to engage in commercial transactions. Such coupons are effective if utilized by a sufficiently high percentage of customers. Utilizing this gauge, free-standing inserts are not very effective. Their redemption rate is presently approximately 2.8 percent and dropping.

Typically, coupons are physically collected at stores and credit is provided to the customer purchasing the corresponding product. The coupons are generally bundled and forwarded to a clearing house and then to a redemption center for sorting and counting. Reports are eventually forwarded to the manufacturers issuing the coupons in order to eventually generate a credit to the stores redeeming the coupons. It may unfortunately take several months before a store is reimbursed for coupons under present coupon redemption/processing methods.

Another problem with coupons is a significant misredemption rate of between 20 and 30 percent as a result of misidentification and outright fraud. The misredemption problem is exacerbated by the enormous amount of time, usually a number of months, that it takes to reimburse the retail stores for the discount given the customer.

Attempts have been made to address such problems. Such attempts, however, have resulted in additional problems, while not fully addressing the problems described above. For example, some companies have implemented a product specific micro-marketing system tied to a product point of selection and proprietary hardware in the form of an alerting platform attached to a grocery cart. A consumer within a retail establishment presses a button on the grocery cart alerting platform to select an electronic coupon when a coupon is graphically displayed at the exact product location within the retail establishment. The customer and the cart must be located at the point of selection to access the coupon. Such a micro-marketing system is proprietary in nature and requires a customer to retrieve a coupon only from the point of selection within the store. Thus, because of the proprietary nature of the system, the coupons, the alerting platform and other proprietary hardware cannot be utilized at other retail establishments. Further, the enterprise associated with the retail establishment is burdened by the maintenance, replacement, and repair of the proprietary hardware attached to the retail establishment's shopping carts due to use, abuse, the weather and so forth. Other systems known in the art utilize smart cards and card readers/writers at point of product selection for obtaining coupon data. Such systems, however, force the user to retrieve data at the point of product selection (i.e. point of selection), thereby tying their shopping activities to a proprietary system.

Accordingly, alternatives are needed to traditional mass marketing and couponing techniques, and proprietary, point of selection type systems. A need exists for non-, or solely-, proprietary, based systems that are flexible, efficient and consumer friendly. Further a need exists for credit devices that are not completely owned by the enterprise or retail establishment, but owned by the customers themselves and which can be utilized at other retail establishments and enterprises. Such a device and associated systems and methods, should be ubiquitous in nature to avoid the problems inherently associated with prior micro-marketing systems.

It has become apparent to the present inventors that the ability to acquire, store and use negotiable economic credits, such as coupons, on hand held devices would free users of the time consuming tasks of clipping, organizing and redeeming traditional paper coupons or credits (e.g., frequent flier redemption via paper-based request), and the problems associated with proprietary micro-marketing systems. It has also become apparent to the present inventors that for merchandisers and manufacturers, such hand held devices could be utilized to effectively market, compile and negotiate credit exchanges/redemption much more efficiently than the traditional paper processing methods or proprietary-based micro-marketing systems and methods.

It is believed that aspects of the invention presently described herein solve the traditional problems associated with negotiable economic credits, including coupons, cash, credit and enterprise awards, and the problems associated with proprietary-based marketing systems thereof, while addressing an area of user control that has not yet been considered, anticipated, or utilized by coupon/credit merchandisers and manufacturers, namely, the increasing number of individuals who rely on hand held devices, such as PDAs, to maintain and store personal and business information.

SUMMARY

It is therefore an aspect of the present invention to provide improved methods and systems for conducting E-commerce utilizing hand held devices.

It is another aspect of the present invention to provide improved methods and systems for processing negotiable economic data (e.g., coupons, cash, credits, or other financial incentives and awards) through hand held devices.

It is yet another aspect of the present invention to provide improved methods and systems, which may include program products, for generating, capturing, and redeeming negotiable economic credits.

It is still another aspect of the present invention to facilitate the processing of negotiable economic credits through hand held devices.

The above and other aspects are achieved as are now described. Methods and systems for processing negotiable economic credits through a hand held device in association with a third-party provider communicative with the hand held device is disclosed herein. At least one negotiable economic credit may be transferred from a third-party provider communicative with the hand held device to the hand held device and/or a point of sale. The negotiable economic credit may be stored within a memory of the hand held device and/or point of sale for retrieval and processing at a point of sale associated with a retail establishment. The negotiable economic credit can be associated with a security module for protecting the privacy of the negotiable economic credit. A user profile may be compiled for utilization during the retrieval of the negotiable economic credit, in response to user input. The user profile can be stored in a database associated with the third-party provider and/or a database associated with the hand held device. The user profile can also be stored in a user profile database associated with a transaction broker.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
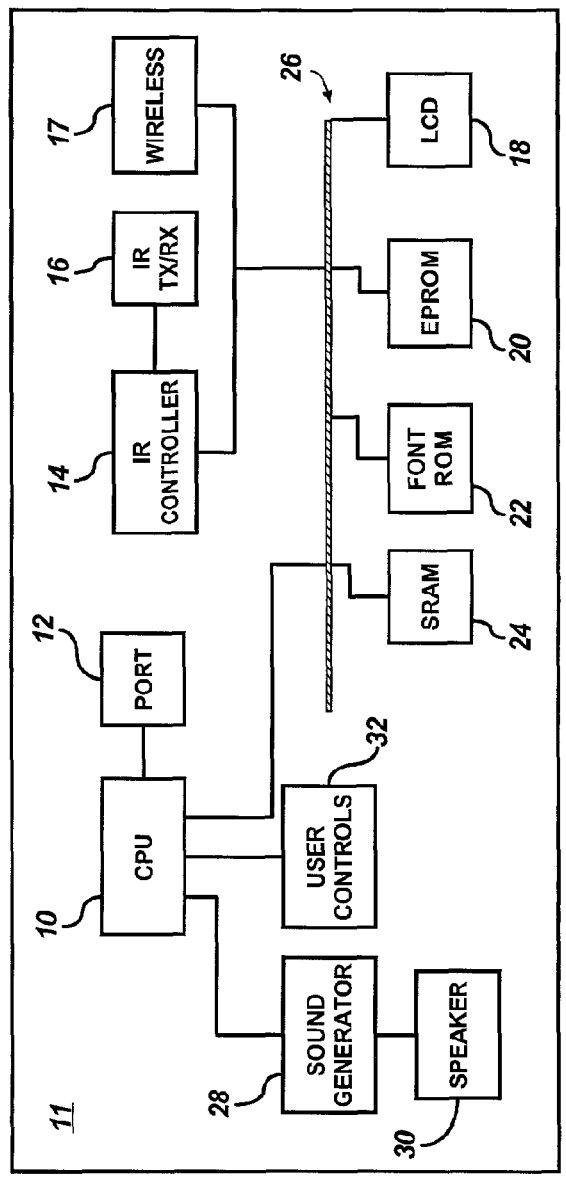
FIG. 1 depicts a schematic diagram illustrating a hardware configuration of a hand held device, in accordance with preferred embodiments of the present invention.

FIG. 1 depicts a schematic diagram illustrating a general hardware configuration of a hand held device 11, in accordance with an embodiment of the present invention. Those skilled in the art can appreciate, however, that other hardware configurations may be utilized, and are further described herein, to implement hand held device 11. CPU 10 of hand held device 11, acts as a main controller operating under the control of operating clocks supplied from a clock oscillator (OSC) 13. CPU 10 may be configured as a 16-bit microprocessor. External pins of CPU 10 are generally coupled to an internal bus 26 so that it may be interconnected to respective components via internal bus 26.

SRAM 24 may be a writeable memory that does not require a refresh operation and may be generally utilized as a working area of CPU 10. SRAM (Static RAM) may be a form of semiconductor memory (RAM) based on a logic circuit known as a flip-flop, which retains information as long as there is enough power to run the device. Font ROM 22 may be a read only memory for storing character images (e.g., font) displayable on a liquid crystal (LCD) panel 18.

CPU 10 of the present embodiment drives LCD display 18 utilizing, among other media, font images from Font ROM 22. EPROM 20 may be a read only memory that may be erasable under certain conditions and may be primarily utilized for permanently storing control codes for operating respective hardware components and security data, such as a serial number.

IR controller 14 may be generally configured as a dedicated controller for processing an infrared code transmitted/received by an IR transceiver 16 and for capturing the same as computer data. Wireless controller 17 may be generally configured as a dedicated controller and transceiver for processing wireless RF data transmitted from and to a wireless communications network.

Port 12 may be connected to CPU 10 and can be temporarily attached, for example, to a docking station to transmit information to and from hand held device 11 to other devices, such as personal computers, retail cash registers, electronic kiosk devices, and so forth. Port 12 can also be configured, for example, to link with a modem, cradle or docking station, which are well known in the art, that permit network devices, a personal computer or other computing devices to communicate with hand held device 11.

User controls 32 permit a user to enter data to hand held device 11 and initiate particular processing operations via CPU 10. In addition, CPU 10 may cause a sound generator 28 to generate sounds of predetermined frequencies from a speaker 30.

Those skilled in the art can appreciate that additional electronic circuits or the like other than, or in addition to, those illustrated in FIG. 1 may be required to construct hand held device 11. Such components, however, are not described in the present specification, because they are well known in the art. Those skilled in the art can thus appreciate that because of the brevity of the drawings described herein, only a portion of the connections between the illustrated hardware blocks is depicted. In addition, those skilled in the art will appreciate that hand held device 11 can be implemented as a specific type of a hand held device, such as a Personal Digital Assistant (PDA), paging device, WAP-enabled mobile phone, and other associated hand held computing devices well known in the art.

When PDAs are deployed, such PDA devices can be further configured with both wireless and wireline communications capabilities, such as those found in cellular telephone units, in accordance with carrying out embodiments of the present invention. Examples of PDA devices that can be utilized in accordance with the method and system of the present invention include the "PalmPilot" PDA, manufactured and sold by Palm Computing, the Handspring Visor, the IBM Workpad, WINDOW CE compatible devices, RIM Blackberry-family paging devices, Motorola paging devices, and the Symbol SPT-family of PDA-type organizer devices. Hand held devices may be also configured with optical scanning/capturing capabilities, in accordance with embodiments of the present invention, which will be further described below.

Figure 2:
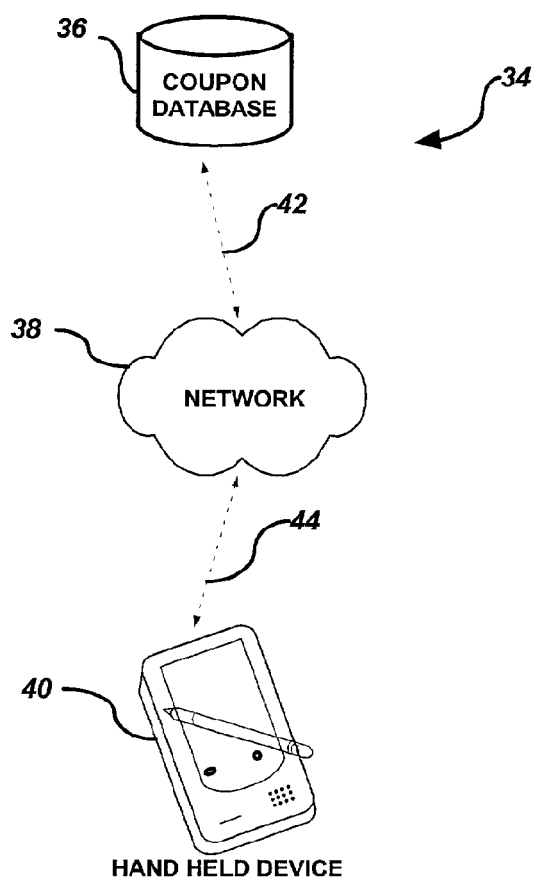
FIG. 2 illustrates a high-level block diagram generally illustrative of an electronic couponing method and system configured with a hand held device, in accordance with preferred embodiments of the present invention.

FIG. 2 illustrates a high-level block diagram 34 generally illustrative of an electronic couponing method and system configured with a hand held device 40, in accordance with preferred embodiments of the present invention. Hand held device 40, which can be configured as a PDA or other hand held device, communicates with network 38. Network 38 communicates with a coupon database 36. Coupon data maintained in coupon database 36 can be retrieved by hand held device 40 through network 38.

Those skilled in the art can appreciate that although hand held device 40 is illustrated as a PDA in FIG. 2, hand held device 40 can be implemented as a wireless application protocol (WAP) web-enabled cellular telephone, or pager or a combination thereof. Hand held device 40 can also be configured as a combination cellular phone/PDA device. An example of such a device is the Handspring palmtop and associated cellular phone attachment, which is manufactured and sold by Handspring Inc. Other such devices include the Palm-Motorola phone, which permits users to access e-mail and store calendars and contact databases.

Thus, according to FIG. 2, electronic coupon data can be stored in coupon database 36. Those skilled in the art can appreciate that such electronic coupons represent one type of negotiable economic credit. Thus, the method and system described herein can apply to the processing of other negotiable economic credits, such as enterprise credits/awards (e.g., frequent flyer miles). Such negotiable economic credits can also be implemented in the form of what has been referred to as electronic cash or currency (i.e., "e-cash"). It should be understood by those skilled in the art that negotiable economic credits can be implemented as actual electronic currency requiring little or no third-party intervention for redemption, or may be implemented in the form of data needed to negotiate a credit transaction with a third-party and a retailer on behalf of a hand held device.

A user can thus access coupon database 36 through network 38. Data can be transmitted to and from network 38, as illustrated by arrow 44. Data can also be transmitted to and from coupon database 36 to network 38, as indicated at arrow 42. Communication between network 38 and hand held device 40 can occur through wireless transmission or direct wireline connections, such as a PDA docking station or cradle. The user thus transmits a request to network 38 to retrieve coupon data from coupon database 36.

Network 38 can thereafter access and retrieve the requested data from coupon database 36 and transmits such data to hand held device 40, in response so user input at hand held device 40. The coupon data can then be stored and/or displayed within a display area of hand held device 40 in the form of one or more electronic coupons which can be redeemed for price discounts at retail establishments associated with such electronic coupons.

An electronic coupon may be essentially a token, issued by or under the authority of the issuer for the benefit of the recipient. Typically, the recipient receives the electronic coupon and subsequently redeems it for the prescribed benefit at some later point in time. Such an electronic coupon can enable or modify an anticipated transaction, such as providing a discount in the price of goods or services provided by the issuer or the issuer's agent.

In addition, such an electronic coupon can enable or modify the level of access to privately held information or a server having restricted access. Alternatively, the electronic coupon can be utilized in transactions between two businesses, two governmental agencies or two governments wherein, for example, the businesses enter into an agreement relating to a transaction for goods or services or access to information, or the governmental bodies enter into an agreement relating to transactions regarding currency or information.

The electronic coupon may be stored and retrieved in the form of coupon data. Such coupon data typically may be composed of a data structure which can include any or all of the following information elements: data representative of an electronic coupon serial number or identification number, data representative of a unique key that can be utilized to validate or authenticate the coupon, data representative of the vendor that authorized the coupon and will redeem the coupon, data representative of the nature of the discount or access provided by the coupon, data representative of the server or entity that issued the coupon.

In one preferred embodiment of the present invention, the electronic coupon contains all the information necessary to redeem the coupon. Specifically, the electronic coupon identifies the grantor (i.e., the party of vendor that will redeem the electronic coupon), the nature of the discount or benefit provided and a unique serial number or other data structure that permits the electronic coupon to be authenticated or validated. Thus, POS-based identifying hardware and software and/or a server redeeming this type of electronic coupon can obtain all the information necessary to redeem from the electronic coupon. Such a server can even include the software necessary to authenticate or validate the electronic coupon (e.g., the coupon manager described herein).

In an alternative embodiment of the present invention, the electronic coupons described herein can be issued as part of an electronic coupon book. The coupon book can include data representative of a version number for the electronic coupon book and data representative of a serial number or identification number for the electronic coupon book. Such an electronic coupon book can be configured to include a unique serial number or identification number and a data structure useful for authenticating or validating the electronic coupon book. In order to redeem this type of electronic coupon, a server and/or coupon manager at a POS, which intends to redeem the electronic coupon must connect to an authentication server, which authenticates or validates the coupon book and indicates the nature of the benefit of the electronic coupon to the server or coupon manager requesting authentication/validation.

Figure 3:
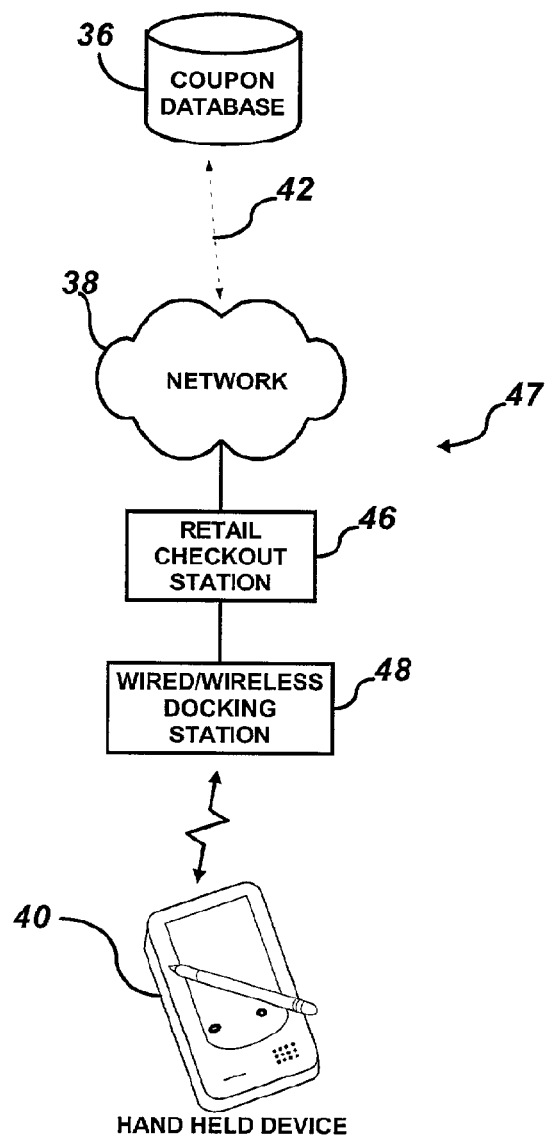
FIG. 3 depicts a block diagram illustrating additional details of an electronic couponing method and system utilizing a hand held device, in accordance with preferred embodiments of the present invention.
Figure 4:
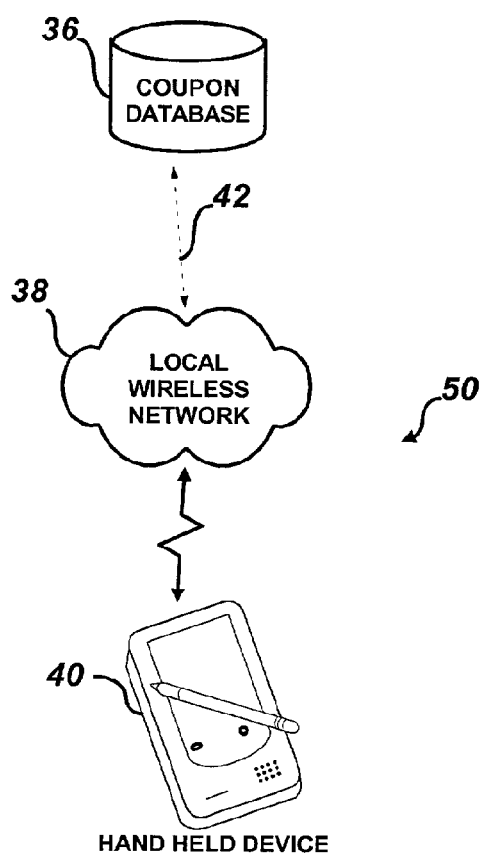
FIG. 4 illustrates a high-level block diagram illustrating a wireless electronic couponing method and system utilizing a wireless hand held device, in accordance with preferred embodiments of the present invention.

FIG. 3 depicts a block diagram 47 illustrating additional details of an electronic couponing method and system utilizing a hand held device 40, in accordance with preferred embodiments of the present invention. In FIG. 3 and FIG. 4 like parts are indicated by like numbers. Thus, block diagram 47 of FIG. 4 is analogous to block diagram 34 of FIG. 3. Hand held device 40 can communicate with a retail checkout station 46 via a docking station 48. Docking station 48 can be configured as a PDA cradle for communicating with retail checkout station 46. Docking station 48 can be implemented as a wired or wireless docking station, or a combination thereof.

Docking station 48 and retail checkout station 46 are linked, such that data can be transferred from hand held device 40 to retail checkout station 46. Retail checkout station 46 may be in communication with network 38, which in turn can access coupon database 36 to retrieve coupon data. Coupon data can be retrieved from coupon database 36 and transferred through network 38 to retail checkout station 46. The coupon data can then be transferred from retail checkout station 46 through docking station 48 to hand held device 40.

During a synchronization of hand held device 40 with retail checkout station 46, coupon data can be transferred from hand held device 40 to retail checkout station 46. It should be appreciated by those skilled in the art that the term "synchronization" as described throughout the disclosure herein refers generally to communication for the purpose of transferring and/or comparing data. Such coupon data may be then compared against prices of scanned products at the retail checkout station to determine if product discounts can be calculated, based on particular coupon data transferred from hand held device 40 to retail checkout station 46 through docking station 48. Alternatively, during a transaction at retail checkout station 48 in which coupon data may be transferred to retail checkout station 46 from hand held device 40, new coupon data can be retrieved from coupon database 36 via network 38 and transferred to retail checkout station 46 and thereafter to hand held device 40.

FIG. 4 illustrates a high-level block diagram 50 illustrating a wireless electronic couponing method and system utilizing a wireless hand held device 40, in accordance with preferred embodiments of the present invention. In FIG. 2, FIG. 3, and FIG. 4, analogous parts are indicated by identical reference numerals. Thus, hand held device 40 can retrieve coupon data (i.e., electronic coupons) from coupon database 36 through a wireless local computer network, such as, for example, a Personal Area Network (PAN). As indicated in FIG. 4, coupon data may be transferred from hand held device 40 through local wireless network 38 to coupon database 36.

An example of one type of PAN that may be utilized in accordance with preferred embodiments of the present invention is "Bluetooth," a telecommunications standard well known in the wireless networking arts. "Bluetooth" is a telecommunications standard adopted by a consortium of wireless equipment manufacturers referred to as the Bluetooth Special Interest Group (BSIG). Bluetooth is generally a global standard for low cost wireless data and voice communications.

A current specification for the Bluetooth standard is in a 2.4 GHz ISM frequency band. Bluetooth is generally based on a short-range radio transmitter/receiver capability built into small application specific circuits (ASICs) and embedded into support devices. A Bluetooth-enabled device generally has 1 mw of transmitter power and is capable of asymmetrical data transfers of up to 721 Mbps over distances of 10 M. Bluetooth permits up to 100 mw of power, which increases frequency hopping of up to 1600 hops per second.

Figure 5:
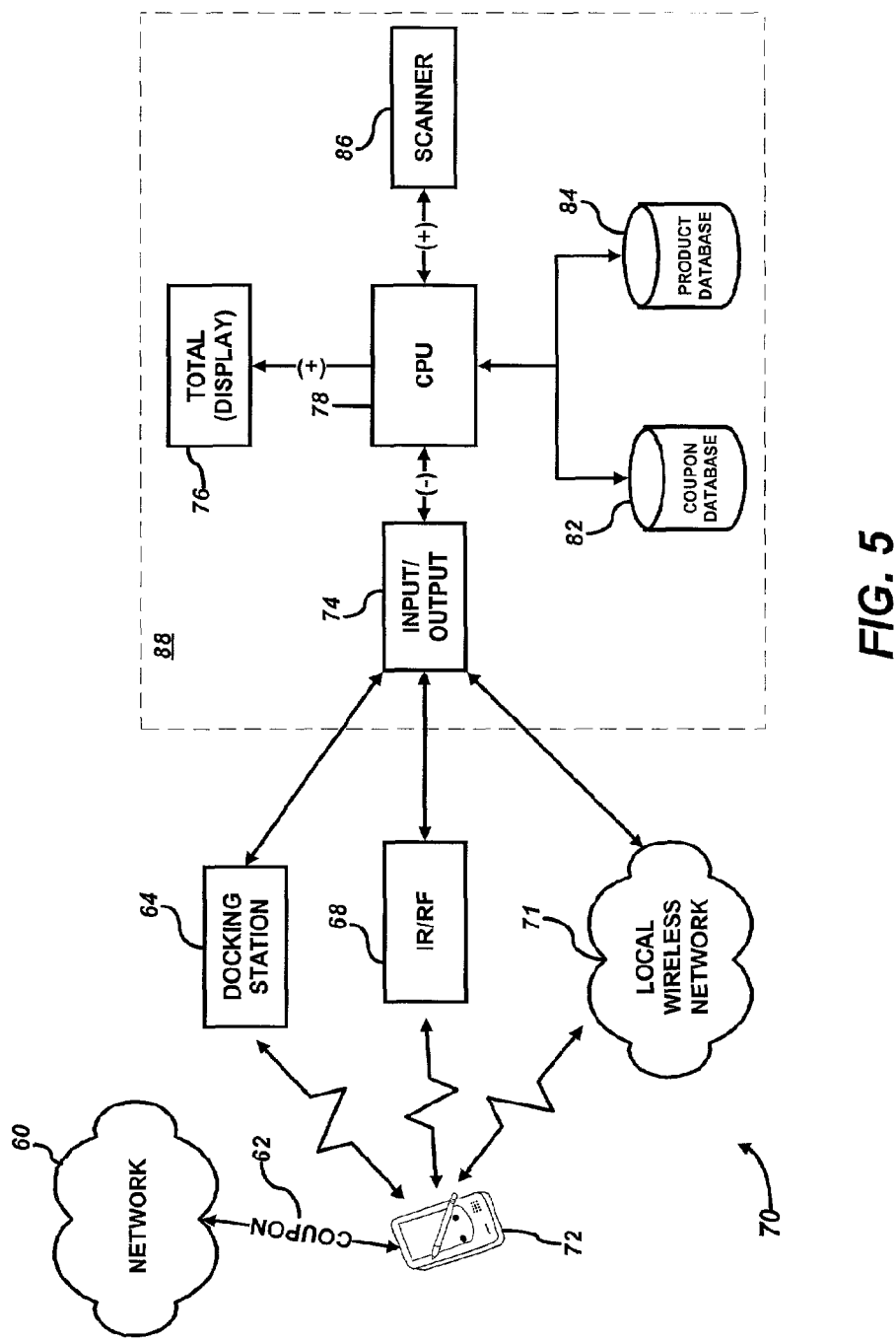
FIG. 5 depicts a block diagram illustrative of an electronic couponing method and system, in accordance with preferred embodiments of the present invention.

FIG. 5 depicts a block diagram 70 illustrative of an electronic couponing method and system, in accordance with preferred embodiments of the present invention. According to FIG. 5, hand held device 72 retrieves a coupon or coupons (i.e., electronic coupons) in the form of electronic data from network 60. Hand held device 70 can communicate with a point of sale (POS) 88 at a retail establishment through a variety of mechanisms, such as docking station 64, infrared communications unit 68 or through a local RF wireless network 71, such as the Bluetooth-type local wireless network described herein.

POS 88 receives or transmits data at input/output unit 74. Thus, any coupon data transferred from hand held device 72 may be transferred to POS 88 through input/output unit 74. Items purchased at the retail establishment are scanned at POS 88 utilizing a scanner 86 that can read and store, for example, scanned UPC codes. Those skilled in the art can appreciate that although scanner 86 is presented for purposes of describing a particular embodiment of the present invention, other types of scanning devices, e.g., bar code scanners, may also be utilized in place of scanner 86. For example, scanning devices that utilize holographic scanning configurations or RF Tags can also be utilized to scan product information.

Product data (e.g., product prices) obtained as a result of scanning purchased items may be transferred to CPU 78 for processing with coupon data received from hand held device 72 at input/output unit 74. The coupon data transferred from hand held device 72 contains electronic coupons associated with particular products offered by the retail establishment. A product database containing product data may be linked to CPU 78. A coupon database 82 from which coupon data can be stored and retrieved may be also linked to CPU 78.

CPU 78 compares the price of scanned products/items based on product data stored in product database 84 with the discounted price associated with user provided coupon data. If a matching product is identified in product database 84, CPU 78 subtracts the discounted price from scanned product price. When scanning is complete, CPU provides a total price, which includes coupon discounts and displays this total price at display 76 for the user to view. Thereafter, new coupon data can be retrieved from coupon database 82 by CPU 78 and transmitted to hand held device 71 through input/output unit 74. New coupon data may be used, for example, for future transactions.

The coupon data originally transferred from hand held device 72 can be flagged and stored in coupon database 82 to indicate that such coupon data has already been utilized in a transaction at the retail establishment by the user of the hand held device 72. Such a flagging operation ensures that the user can only utilize the coupon data for a single purchase transaction. In addition, the coupon data retrieved from hand held device 72 and utilized during a purchase transaction can be deleted from the hand held device 72 during a synchronization of hand held device 72 and POS 88. CPU 78 can be instructed to generate and transmit a message to hand held device 72 during synchronization to indicate that the electronic coupons retrieved from hand held device 72 and utilized during the purchase transaction has been successfully utilized to discount products scanned by scanner 86 or another scanning device (e.g., holographic scanner, RF tags) utilized in accordance with preferred embodiments of the present invention.

Figure 6:
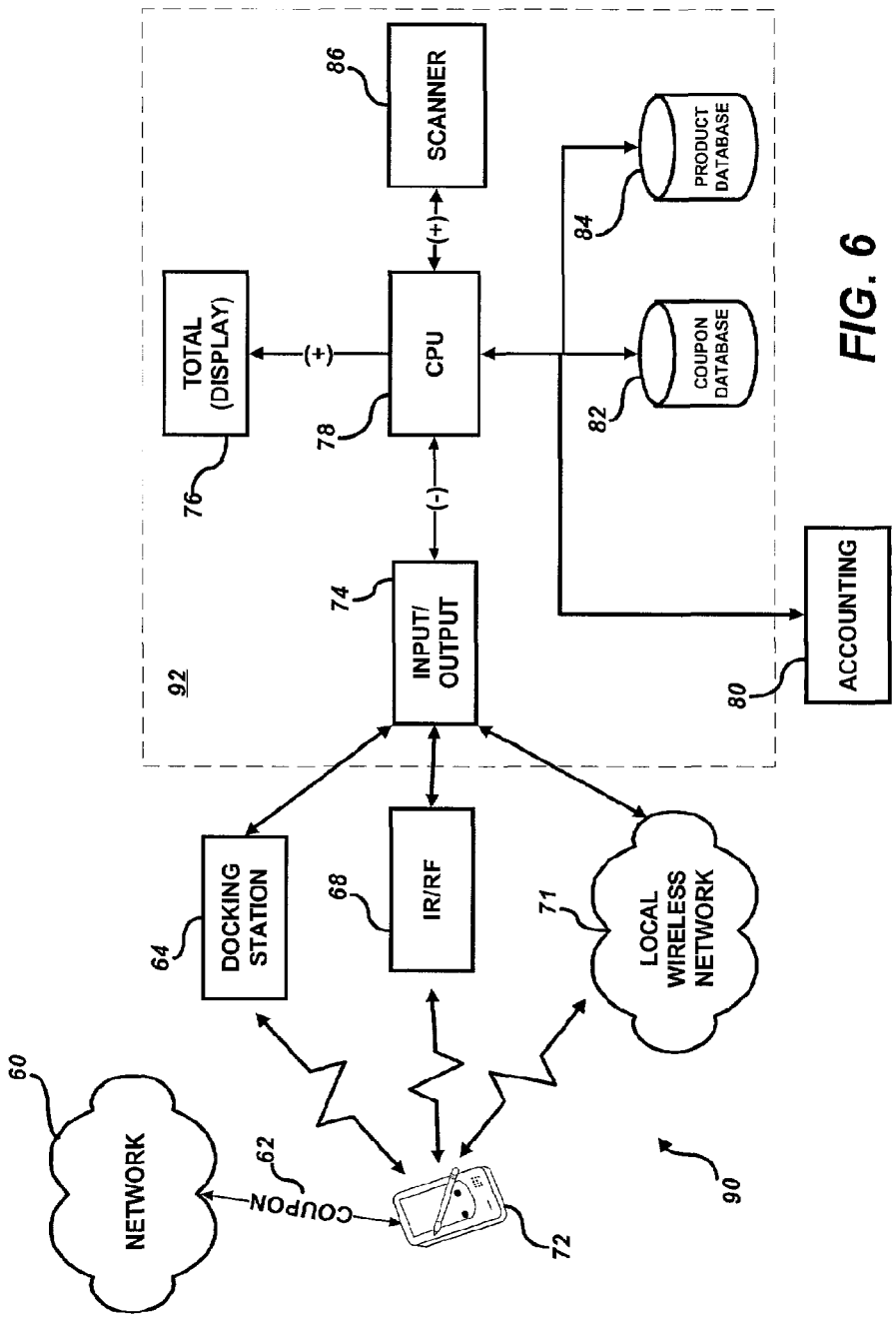
FIG. 6 illustrates a block diagram illustrative of an alternative electronic couponing method and system, in accordance with preferred embodiments of the present invention.

In FIG. 5 to FIG. 12, analogous parts are indicated by identical reference numerals. Those skilled in the art will appreciate that the block diagrams illustrated in FIG. 5 to FIG. 12 herein represent alternative preferred embodiments of the present invention and that similar parts may be utilized to implement such alternative preferred embodiments. Thus, FIG. 6 illustrates a block diagram 90 illustrative of an alternative electronic couponing method and system, in accordance with preferred embodiments of the present invention.

Block diagram 90 of FIG. 6 is similar to block diagram 70 of FIG. 5, the difference evident in the addition of an accounting module 80, which interacts with POS 92 to keep track of purchase transactions, including coupon synchronizations with hand held devices and discounted prices thereof, that occurred at the POS 92 during a particular period of time, such as for example, a twenty-four period or during a particular shift. Accounting module 80, as illustrated in block diagram 90 of FIG. 6, is depicted outside the bounds of POS 92. CPU 78 can be linked to accounting module 80 through a wireless or direct link or through a network. Although not illustrated in FIG. 6, those skilled in the art can appreciate that accounting module 80 can be incorporated at the POS as a program product controlled by CPU 80. Accounting data can then be retrieved for use by accounting personnel/resources of the enterprise.

Such modules, including the other modules discussed herein, can be implemented in the form of software modules. In the computer programming arts, a module may be typically implemented as a collection of routines and data structures that performs particular tasks or implements a particular abstract data type. Modules generally are composed of two parts. First, a software module may list the constants, data types, variable, routines, and so forth, which can be accessed by other modules or routines. Second, a software module may be configured as an implementation, which may be private (i.e., accessible only to the module), and which contains the source code that actually implements the routines or subroutines upon which the module is based. Thus, when referring to a "module" herein, the present inventors are referring so such software modules or implementations thereof. Such modules can be utilized separately or together to form a program product that can be implemented through signal-bearing media, including transmission media and recordable media.

Figure 7:
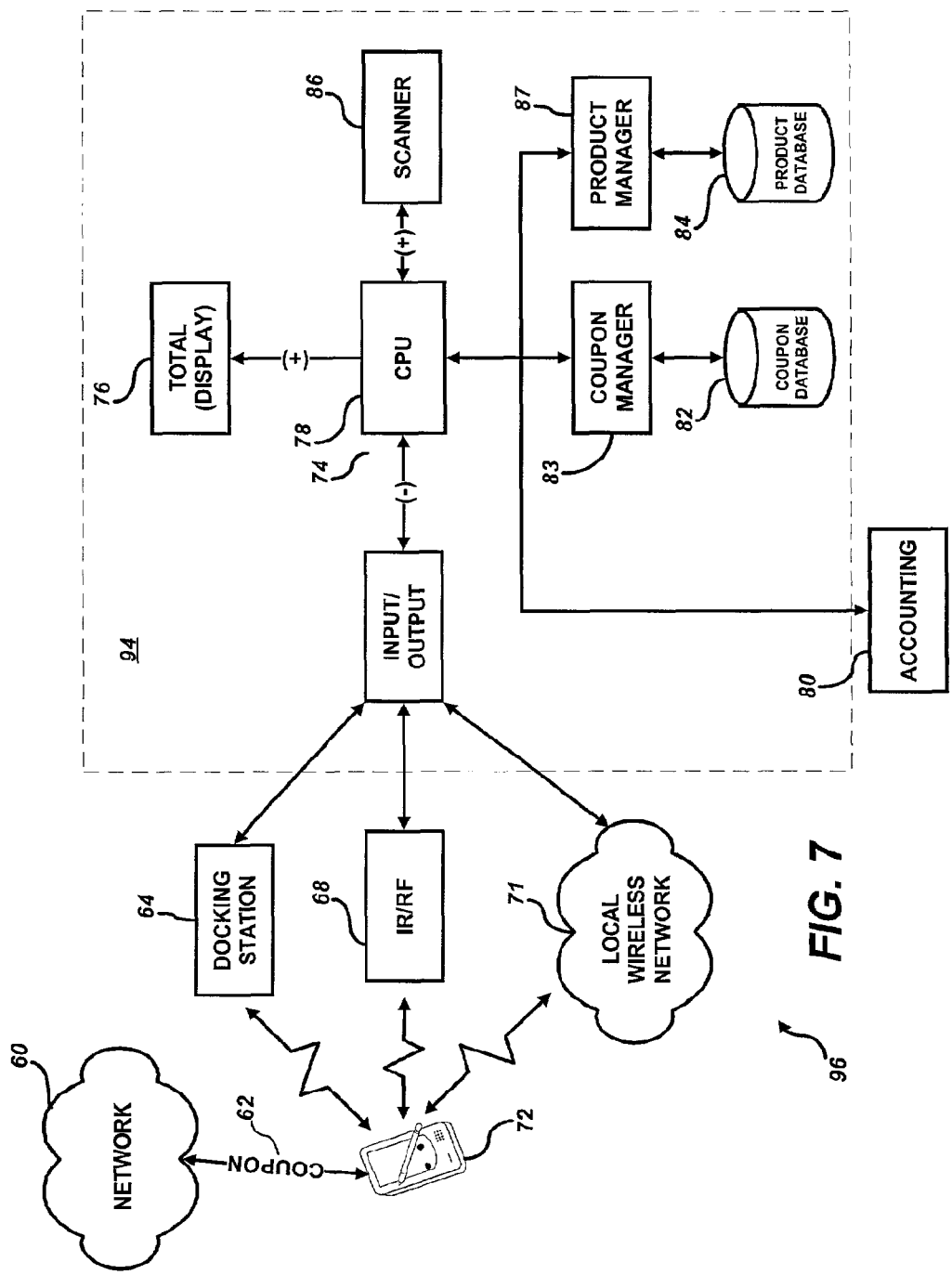
FIG. 7 depicts a block diagram illustrating the implementation of a coupon manager module at a retail point of sale, in accordance with preferred embodiments of the present invention.

FIG. 7 depicts a block diagram 96 illustrating the implementation of a coupon manager 83 at a retail POS, in accordance with preferred embodiments of the present invention. Coupon manager 83 can be implemented as a software module located in a memory location of an authentication server, which includes software necessary to authenticate electronic coupons prior to their redemption. Likewise, coupon manager 83 can function as the authentication agent for authenticating coupons prior to their redemption. Operational and system components depicted in FIG. 5 and FIG. 6 herein are analogous to the operational and system components illustrated in FIG. 7. Block diagram 96 of FIG. 7, however, additionally includes a coupon manager module (i.e., coupon manager 83) in communication with coupon database 82 and CPU 78.

Coupon Manager 83 also can communicate with accounting module 80, whether at the POS 94 or elsewhere, and product manager 87. Product manger 87 can communicate with product database 84, coupon manager 83, accounting module 80, and CPU 78.

Coupon manager 83 may be implemented as a software module that instructs CPU 78 to retrieve coupon data from hand held device 72 during a synchronization with hand held device 72. Coupon manager 83 can also instruct CPU 78 to transmit data back to hand held device 72 during a synchronization with hand held device 78. In addition, coupon manager 78 can instruct CPU 78 to subtract price discounts associated with retrieved coupon data from prices associated with purchased items scanned with scanner 86.

Coupon manager 83 may also retrieve new coupons from coupon database 82 that may be provided through the POS 94 to hand held device 72 for use during future purchases. Thus, coupon manager 83 provides product pricing and identification information based on, for example, UPC information retrieved from a scanned product by bar code scanner 86. Pricing information may be utilized by CPU 78 to render a subtotal of items purchased (i.e., "subtotal" meaning prior to coupon deductions).

Information related to products retrieved from product database during scanning may be also utilized to associate the scanned product to the coupons retrieved as coupon data from hand held device 72. If scanned products match the coupons retrievable from hand held device 72, then a new total may be rendered based on the value of the coupons subtracted from the subtotal, and the matching coupons are retrieved from hand held device 72 for the retail establishment to obtain their credit due from associated product distributors.

Figure 8:
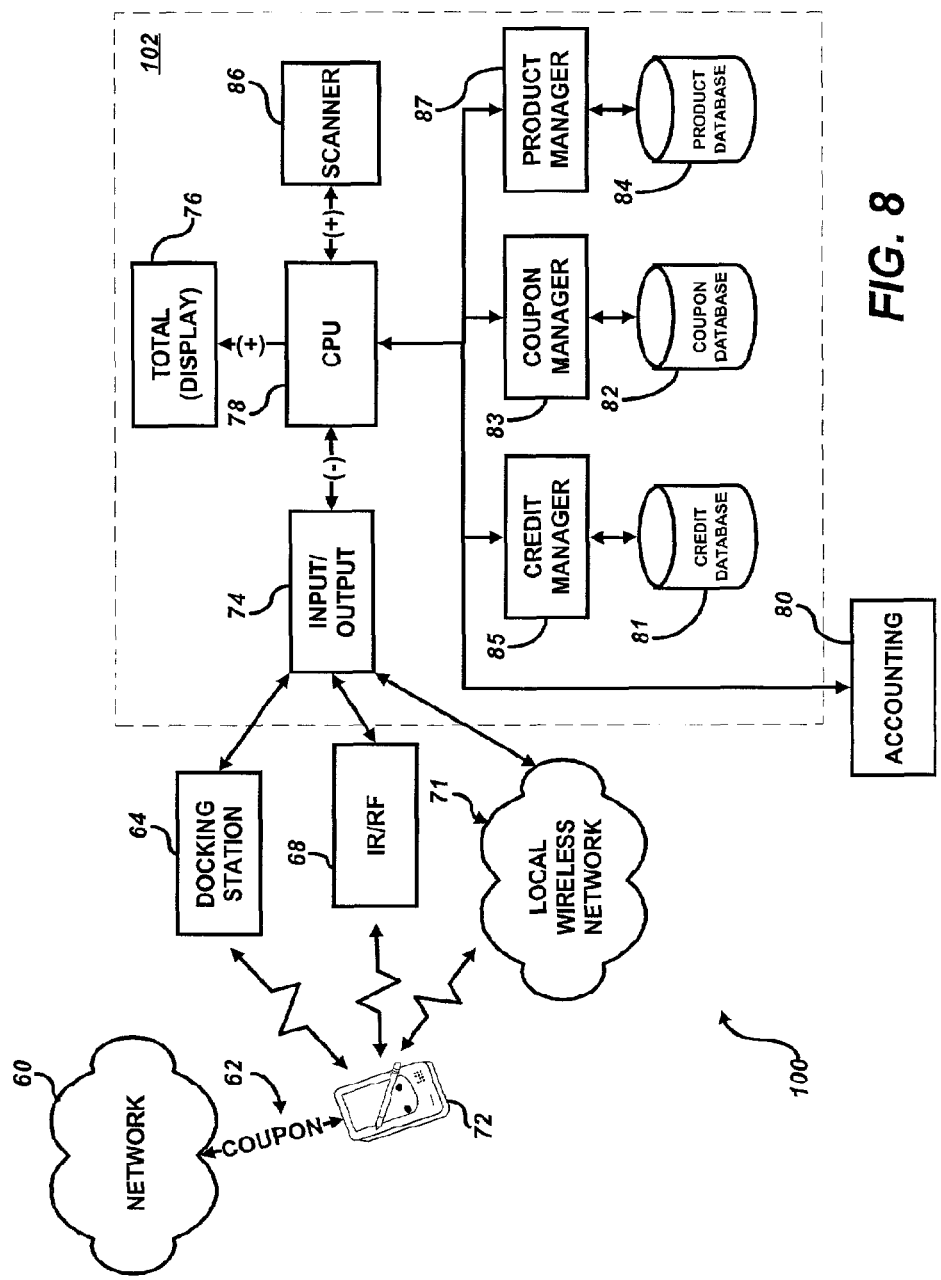
FIG. 8 illustrates a block diagram illustrating the implementation of a credit manger module at a retail point of sale, in accordance with preferred embodiments of the present invention.

FIG. 8 illustrates a block diagram 100 illustrating the implementation of a credit manger 80 at a retail POS, in accordance with preferred embodiments of the present invention. Credit manager 80 may be a software module that retrieves credit data (i.e., credits or awards associated with retail/commercial transactions) from a credit database 81. Credit manager 80 can be configured to communicate with CPU 78, coupon manager 83, and product manager 87.

In addition, credit manager 85 can communicate with accounting module 80. Again, those skilled in the art will appreciate that accounting module 80 can be configured at the POS 102 or at another location and linked to CPU 78 via a network link. Initially, items are scanned at POS 102. Hand held device 72 may be synchronized with POS 102 through input/output 74 and possible interfacing mechanisms, such as docking station 64, infrared communications unit 68 or through local wireless network 71.

Credit manager 85 can be initialized in response to synchronization between hand held device 72 and POS 102 and/or in response to item scanning. Credit manager 85 accesses credit database 81 and determines associations between scanned items and credit or point information accessed from credit database 81. If a matching association may be identified, credit manager 85 retrieves credits from credit database 81. Credit manager 85 then instructs CPU 78 to process these credits, which are then transferred by CPU 78 through input/output unit 74 to hand held device 72.

The credits can be then stored in a database associated with hand held device 72 for later retrieval by hand held device 72. When a certain number of credits are earned by the user of hand held device 72 following a particular number of transactions, the user can be eligible to receive discounts on future purchased items, or discounts or awards of products or services offered by other establishments or enterprises that have business alliances in place with the retail establishment or organization through which the credits were earned by the user.

Figure 9:
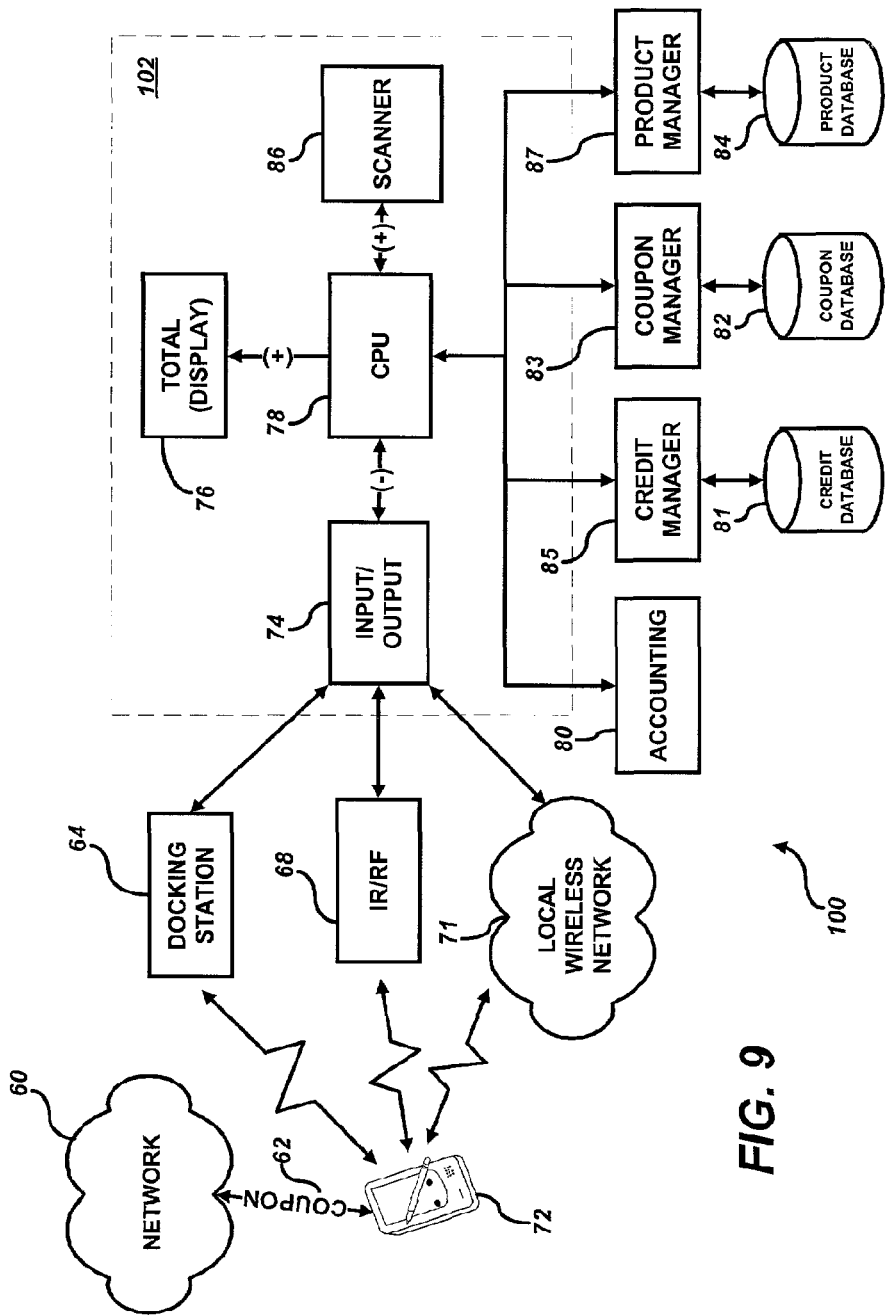
FIG. 9 depicts a block diagram illustrating the implementation of credit manager, coupon manager, product manager, and accounting modules located away from the retail point of sale, in accordance with preferred embodiments of the present invention.

FIG. 9 depicts a block diagram 100 illustrating the implementation of credit manager 85, coupon manager 83, product manager 87, and accounting module 80 located away from the retail POS 102, in accordance with preferred embodiments of the present invention. POS 102 includes CPU 78 connected to input/output unit 74, display 76, and scanner 86. Unlike POS 102 of FIG. 8, POS 102, as illustrated in FIG. 9, may be configured to communicate with credit manager 85, coupon manager 83, product manager 87, and accounting module 80 indirectly rather than directly at POS 102. Those skilled in the art can thus appreciate that block diagram 100 of FIG. 9 may be simply an alternative preferred embodiment of the configuration depicted in FIG. 8. The various described modules can be incorporated into POS 102 at, for example, a cash register or cash register/scanning system, or can be implemented as software modules residing in computer memory in a remote computer network linked to POS 102.

Figure 10:
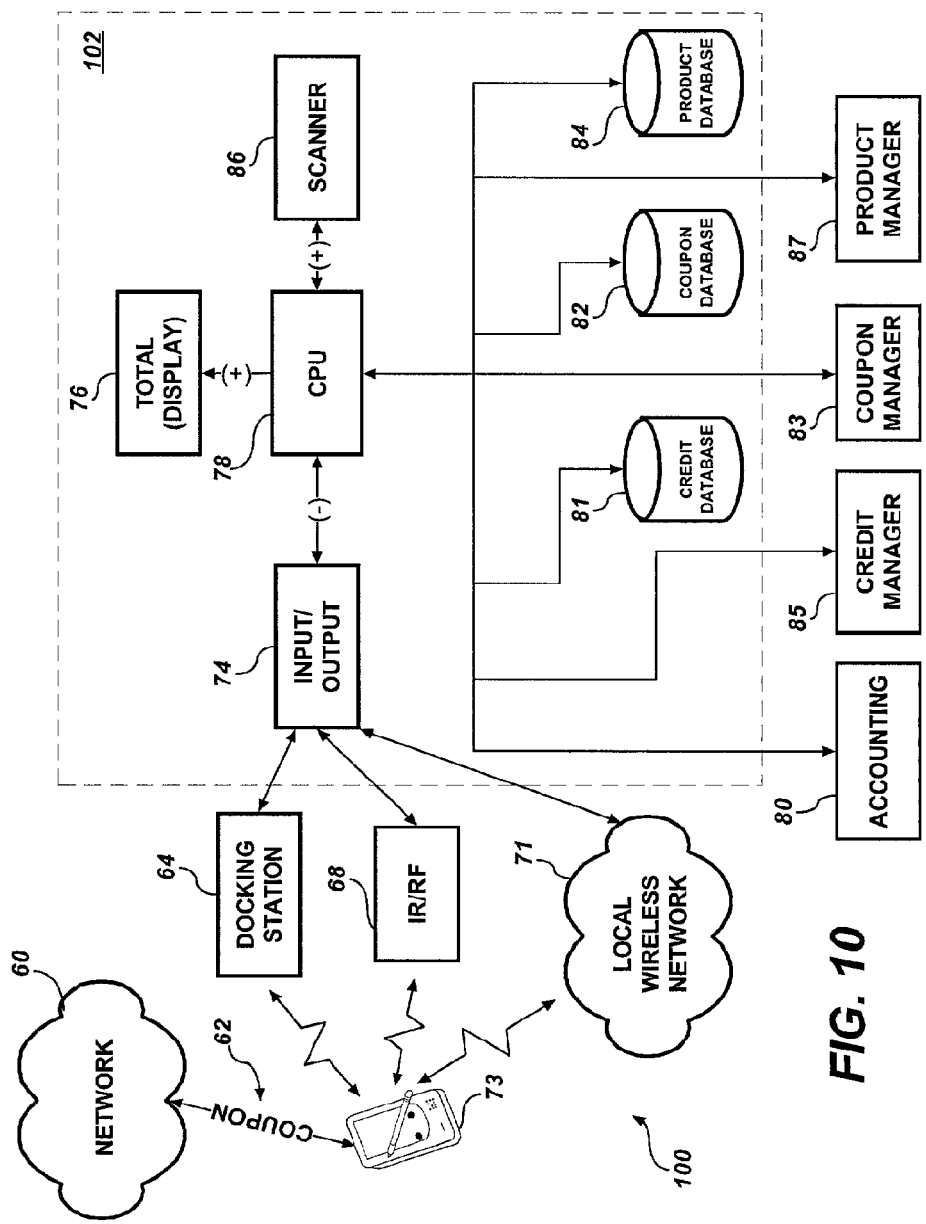
FIG. 10 illustrates a block diagram illustrating the implementation of credit manager, coupon manager, product manager, and accounting modules outside a retail point of sale, in association with a hand held device configured as a PDA, in accordance with preferred embodiments of the present invention.
Figure 11:
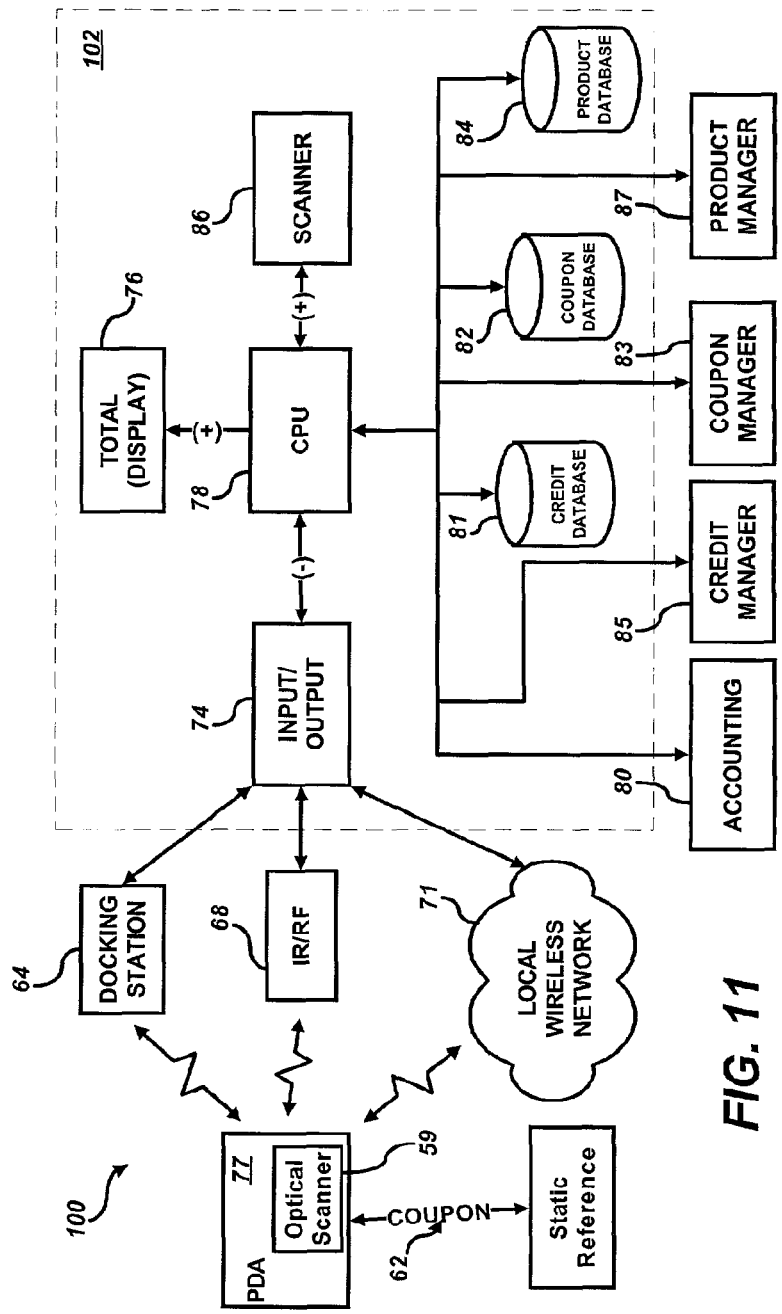
FIG. 11 illustrates a block diagram illustrating the implementation of credit manager, coupon manager, product manager, and accounting modules located outside the retail point of sale, in association with a hand held device configured as a PDA integrated with an optical scanner, in accordance with preferred embodiments of the present invention.
Figure 12:
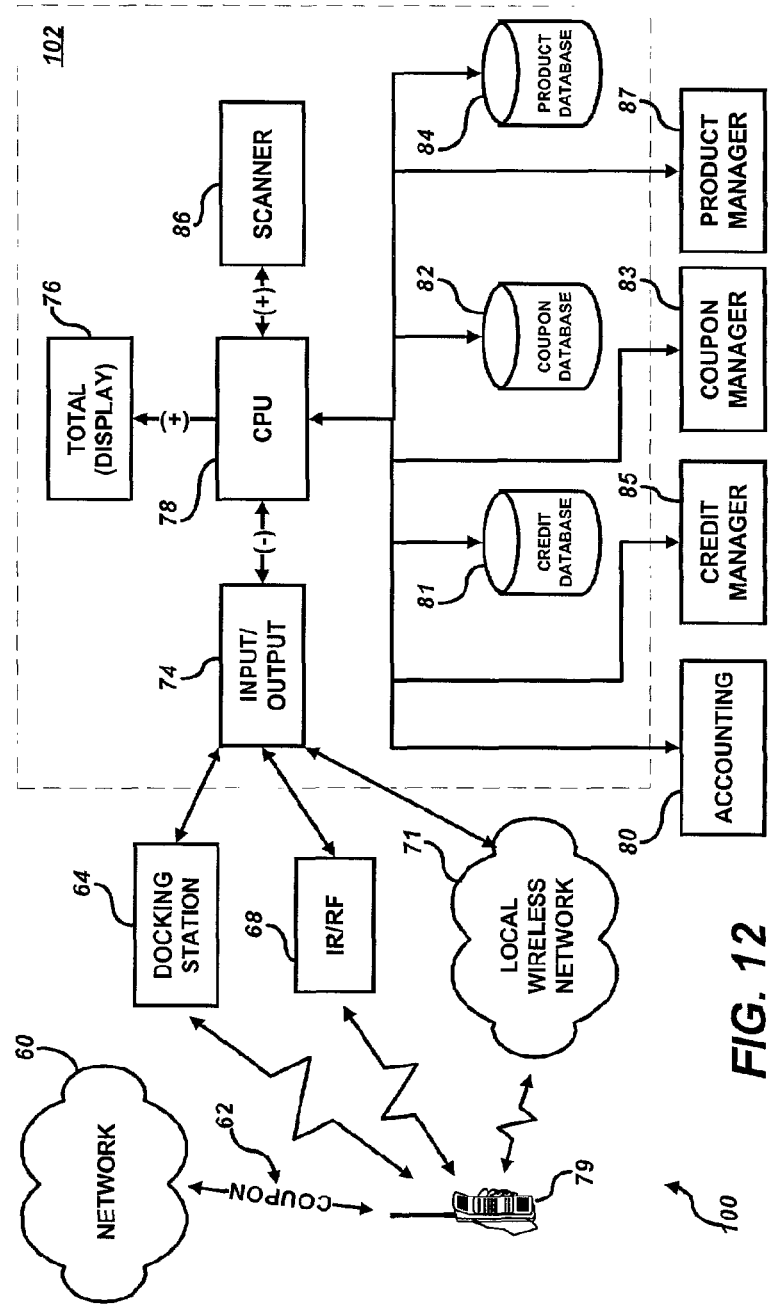
FIG. 12 illustrates a block diagram illustrating the implementation of credit manager, coupon manager, product manager, and accounting modules located away from the retail point of sale, in association with a hand held device configured as a wireless telephone, in accordance with preferred embodiments of the present invention.

FIG. 10 to FIG. 12 illustrate alternative preferred embodiments of the present invention that utilize various types of hand held devices. In FIG. 10 to FIG. 12, analogous parts are indicated by like reference numerals. Thus, FIG. 10 illustrates a block diagram 100 illustrating the implementation of credit manager 85, coupon manager 83, product manager 87, and accounting module 80 located away from the retail POS 102, while credit database 81, coupon database 82 and product database 84 are configured to operate at POS 102.

In FIG. 10, hand held device 73 may be configured as a PDA, in accordance with preferred embodiments of the present invention. A "PDA" may include a two-way paging device, such as the Blackberry-family of paging devices manufactured by RIM or Smart Phones proposed by numerous wireless industry manufacturers. Hand held device 73 of FIG. 10 may be configured as a PDA having wireless or wireline communications capabilities or a combination thereof, thus communicating with POS 102 through local wireless network 71, infrared (IR/IRF) communications unit 68 or docking station 64.

FIG. 11, on the other hand, illustrates a hand held device 77 configured as a PDA integrated with an optical scanner, in accordance with preferred embodiments of the present invention. In FIG. 11, credit manager 85, coupon manager 83, product manager 87, and accounting module 80 are illustrated outside the retail POS, in association with hand held device 77. Hand held device 77 may be configured with an optical scanner that can scan coupon data and electronic coupons thereof from a static reference or representation, such as a newspaper, magazine, and so forth.

Optical scanner 59 thus retrieves coupons 62 from static reference 57 by scanning or capturing electronic coupon data or other associated data (e.g., product data). In the case of a bar code reader, the electronic coupons (e.g., coupon data) are scanned. In the case of an optical reader with capturing capabilities, images representatives of coupons or coupon data are captured. The coupons (i.e. coupon data) are stored in a hand held device coupon database within hand held device 77 for eventual redemption at POS 102.

Finally, FIG. 12 depicts a hand held device configured as a wireless telephone 79, in accordance with preferred embodiments of the present invention. Those skilled in the art can appreciate, of course, that such hand held devices can be configured to combine each of the primary features of a PDA, pager, and wireless and/or cellular telephone.

Figure 13:
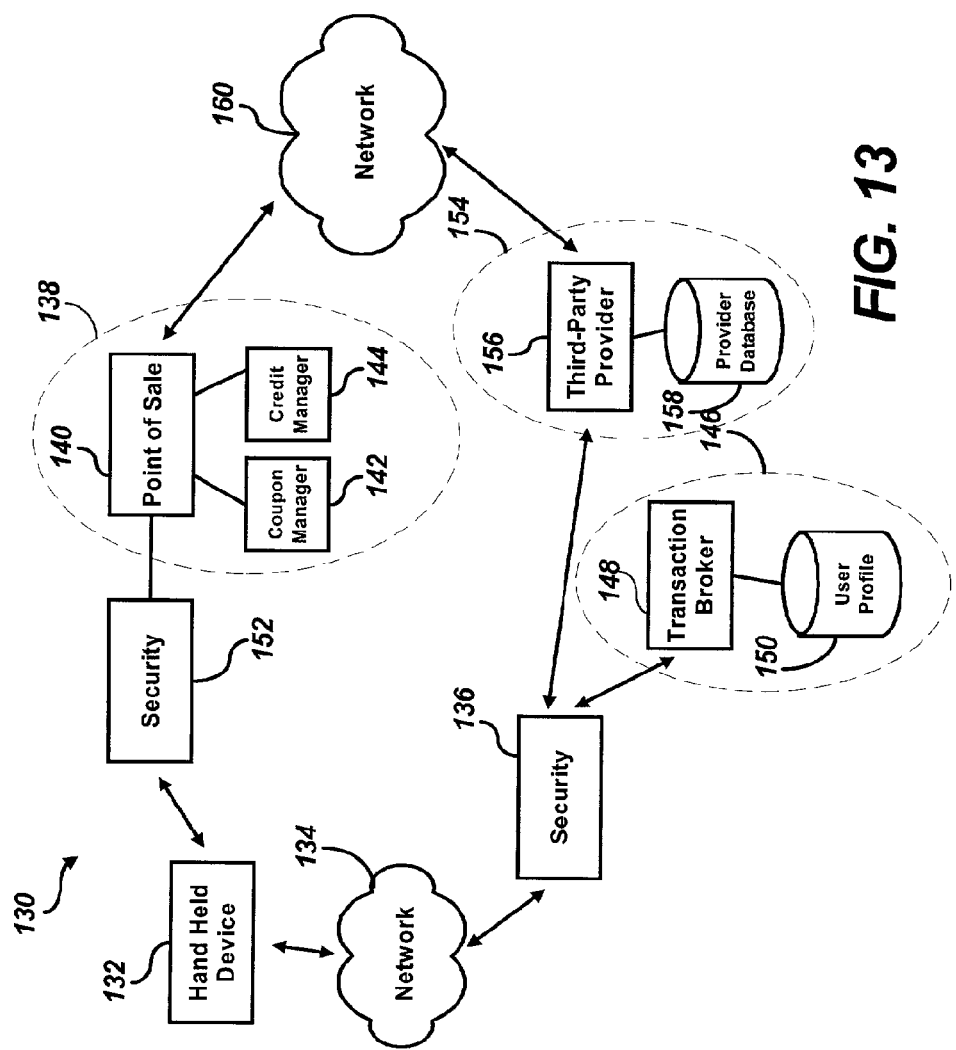
FIG. 13 depicts a system diagram illustrating an electronic coupon and credit management system, in accordance with preferred embodiments of the present invention.
Figure 14:
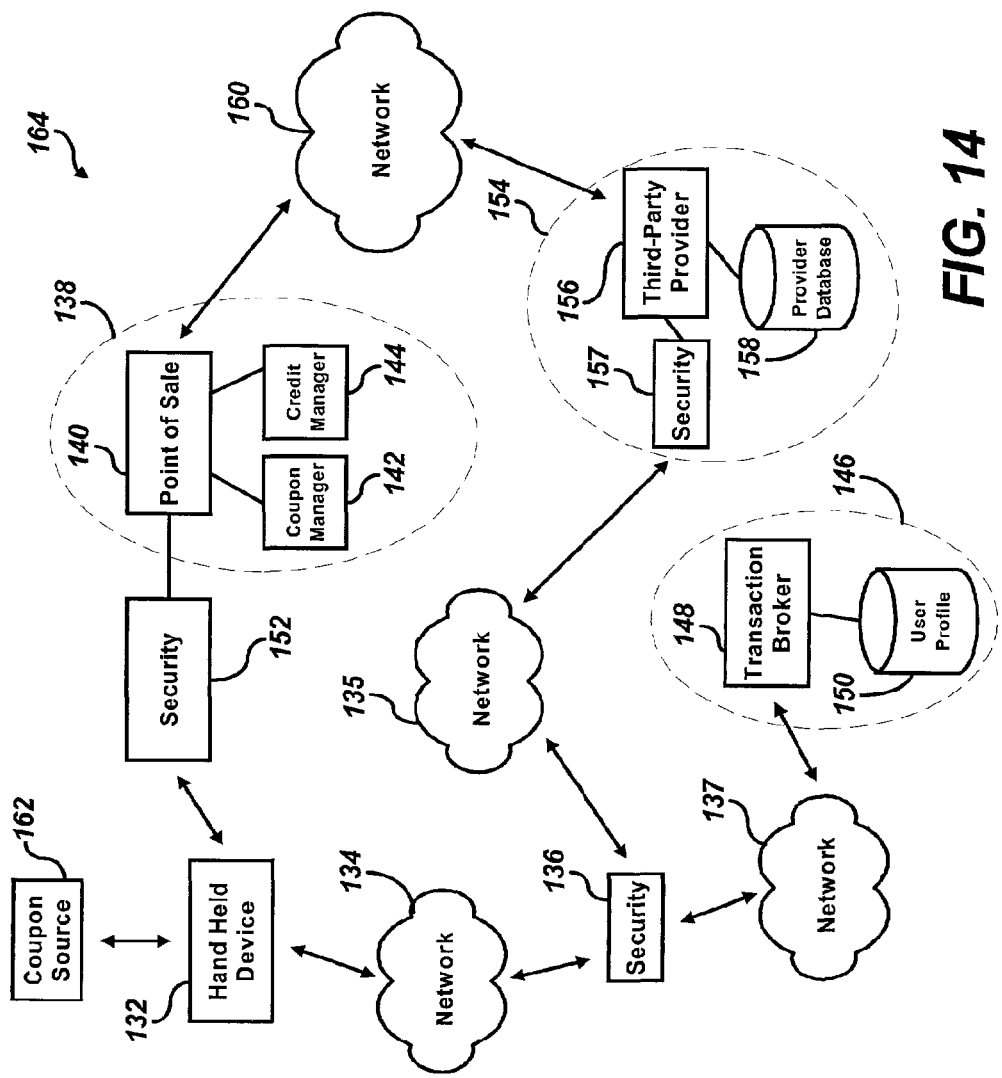
FIG. 14 illustrates an alternative system diagram illustrating an electronic coupon and credit management system, in accordance with preferred embodiments of the present invention.

In FIG. 13 to FIG. 14, analogous parts are indicated by identical reference numerals. FIG. 13 thus depicts a system diagram 130 illustrating an electronic coupon and credit management system, in accordance with preferred embodiments of the present invention. POS 140 may be linked to coupon manager 142 and credit manager 144. Coupon manager 142 is analogous to coupon manager 83 of FIG. 7 to FIG. 12. Credit manager 144 is analogous to credit manager 85 of FIG. 8 to FIG. 12 herein. POS 140, coupon manager 142, and credit manager 144 together comprise retail portion 138 of the electronic coupon and credit management system outlined in system diagram 130. POS 140 is analogous to POS 88, 92, 94, and 102 illustrated in FIG. 5 to FIG. 12 herein.

A security module 152 can be linked to POS 140 to provide secure firewall protection (i.e., security 152). A firewall, well-known in the networking and computer arts, can be configured as a security module that protects an organization's network against external threats, such as hackers, coming from another network, such as the Internet. Firewalls prevent computers or other computing devices within a particular network from communicating directly with computers or other devices, such as hand held device 132, external to the network and vice versa. Instead, all communications are generally routed through a proxy server outside of the organizational network, and the proxy server determines if it is safe to let a particular message or data pass through to the network.

In the configuration illustrated in FIG. 13, retail portion 138 may include a variety of POS devices (e.g., cash register/scanning systems) linked with computers and servers to provide a local enterprise network. As such, any communication with such a network may be filtered through a security module, such as security module 152. Those skilled in the art can appreciate that coupon manager 142 and credit manager 144 can be incorporated, separately or in combination, directly with POS 140 or may be linked to POS 140 through a network link, either wireless- or wireline-based.

Hand held device 132 can communicate with a transaction broker 148 and a third-party provider 156 of coupons/credits. Communication between hand held device 132, transaction broker 148, and third-party provider 156 can occur utilizing a network 134 linked to a security module 136. Security module 136 can be configured as a firewall, as described herein. Transaction broker 148 and third-party provider can be configured as software modules residing in computer memory in a remote computer network, such as the Internet, or other networked configurations.

Network 134 can be configured as a remote computer network, such as the Internet, or a dedicated local network. Third-party provider 156 may be linked to a provider database 158, and transaction broker 148 may be linked to a user profile database contain user profile data. User profile database 150 and transaction broker 148 together form a transaction broker portion 146 of system diagram 130. Provider database 158 and third-party provider 156 together comprise a third-party provider portion 154 of system diagram 130.

If a user desires to obtain electronic coupons to store in hand held device 132, the user can communicate with transaction broker 148 or third-party provider 156 through a network 134. Data transmitted through network 134 to transaction broker 148 or third-party provider 156 may be filtered through the firewall provided by security module 136. Transaction broker 146 may be a module that can manage credits and coupons transmitted between all parties depicted in FIG. 13, including retail portion 138, third-party provider 156, and hand held device 132.

A user can access third-party provider 156 directly through network 134 and security module 136 in order to retrieve coupons provided by third-party provider 156. Third-party provider 156 can be, for example, an organization or enterprise allied with a retail establishment or enterprise associated with POS 140. Retail portion may, for example, be associated with a grocery chain or shopping mall. Third-party provider 156 may, for example, be an airline company offering coupons or airline credits. Third-party provider 156 can communicate with retail portion 138 through a network 160, which again, may simply be the Internet or a dedicated network configured between POS 140 and third-party provider portion 154.

Coupons and associated third-party provider information can be stored in provider database 158 and retrieved by third-party provider 156 for transmission to hand held device 132. Likewise, a user of hand held device 132 can access transaction broker 148 to download electronic coupons to hand held device 132 through security module 136 and network 134. The coupons are provided by transaction broker 148 to hand held device 132 based on a user profile that a user of hand held device 132 previously submitted to transaction broker 148. Thus, coupons transmitted by transaction broker 148 to hand held device 132 may be based on the user's preferences as indicated in an associated user profile stored in the user profile database 150. A user profile may be configured and/or obtained through a network by/from a hand held device 132, or a profile may be set up by a user at broker 148. Initial profile set up at the broker may be via a networked hand held device, personal computer or other means known in the art (e.g., telephonically). Thereafter, coupon retrieval from broker 148 may be by the hand held device 132, networked computer, POS 102 on behalf of the hand held device 132 user. In most situations, however, coupon retrieval will be from a broker 148 to the hand held device 132, and then from the hand held device 132 to the POS 102.

Third-party provider 156 can also provide credit information to the retail establishment associated with POS 140 through network 160, thereby enabling credit manager 164 to maintain and handle transactions involving hand held device 132 and POS 138. The user of hand held device must, of course, have previously registered to receive such credits from third-party provider 156 either directly or with third-party provider 156 or indirectly through transaction broker 148.

FIG. 14 illustrates an alternative system diagram 164 illustrating an electronic coupon and credit management system, in accordance with preferred embodiments of the present invention. As indicated earlier, in FIG. 13 and FIG. 14, like parts are indicated by identical reference numerals. As illustrated in system diagram 164, additional networks can be provided which permit hand held device 132 to communicate with transaction broker 148 or third-party provider 156.

A user can retrieve electronic coupons to be stored in hand held device 132 from a coupon source 162. Coupon source 162 may simply be a web site displayed via the Internet from which coupon data may be downloaded, or coupon source 162 may simply be an implementation of third-party provider 156. Coupon source 162 may also be a static reference, such as a bar code or graphical representation of a coupon printed on a newspaper or magazine. In such a case, the bar code or graphical representation may be associated with one or more electronic coupons.

An optical reader, such as a bar code scanner or other scanning device, can be integrated with a hand held device, such as a PDA or other hand held devices described herein, to retrieve electronic coupons from such a static reference. The static reference may be composed of coupon data representative of electronic coupons themselves that can be redeemed through a hand held device in accordance with the method and system described herein. The static reference may be also configured as data readable by an optical scanning device.

Such data can refer the user of the hand held device to an Internet "web" page containing electronic coupons retrievable by the hand held device. Such a static reference can be configured as a 12-digit number in UPC Coupon Code format. In this format, the first digit may be a 5, designating a coupon. The next five digits may represent a manufacturer ID. The next 3 digits are a family code. The next 2 digits represent a value code. The last digit may be a check digit. The hand held device, such as a PDA, can additionally be configured with a holographic scanning device that optically reads holographic data embedded on print, magazine, cloth, or other physical material.

Coupon source 162 thus illustrates the fact that coupon data (i.e., electronic coupons) are available for retrieval by hand held device 162 as indicated herein.

Network 137 can be utilized to transmit data between security module 136 and transaction broker 148. Those skilled in the art can appreciate that network 137 may be analogous to network 134 (i.e., the two networks may be the same network) or the network may be a stand-alone network linked to security module 136 and transaction broker 148.

Network 137 may also be a remote computer network, such as the Internet, from which data can be retrieved and transmitted.

Likewise, network 135 can be implemented as a dedicated or stand alone network linking security module 136 with a security module 157, or network 135 may simply be a remote computer network, such as the Internet. Security module 157 may be configured as a firewall linked with third-provider 156 to provide additional protection to third-party provider 156 and its associated provider database 158. Those skilled in the art can appreciate that security module 157, along with the other security modules described herein, along with modifications thereof, may be equipped with encryption/decryption routines or subroutines to provide encryption/decryption capabilities to secure data transferred through such security modules. Such security modules may be further modified to include password protection routines or subroutines.

Figure 15:
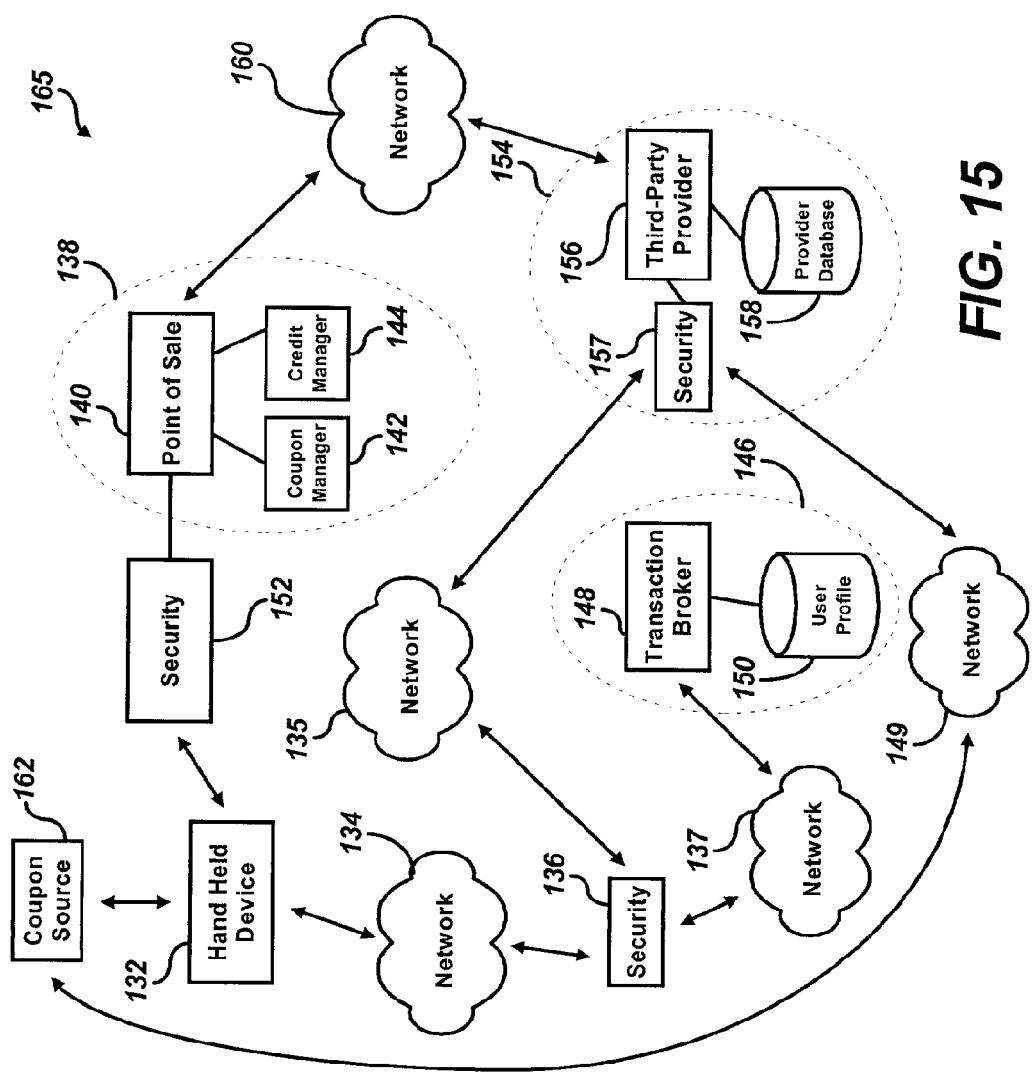
FIG. 15 depicts an alternative system diagram illustrating an electronic coupon and credit management system, in accordance with preferred embodiments of the present invention.

FIG. 15 depicts an alternative system diagram 165 illustrating an electronic coupon and credit management system, in accordance with preferred embodiments of the present invention. FIG. 14 and FIG. 15 are similar, with the exception of an additional network 149 located between security module 157 and coupon source 162. FIG. 15 merely demonstrates the fact that coupon data may be provided by third-party provider 156 through network 149 to hand held device 162 and thereafter redeemed during a transaction involving hand held device 132 at POS 140.

Again, network 149 may be composed of a dedicated network linking coupon source 162 and third-party provider portion 154 or simply the Internet. In such a case 162, coupon source 162 can be configured as a web site operated by an organization or enterprise associated with third-party provider 156.

Figure 16:
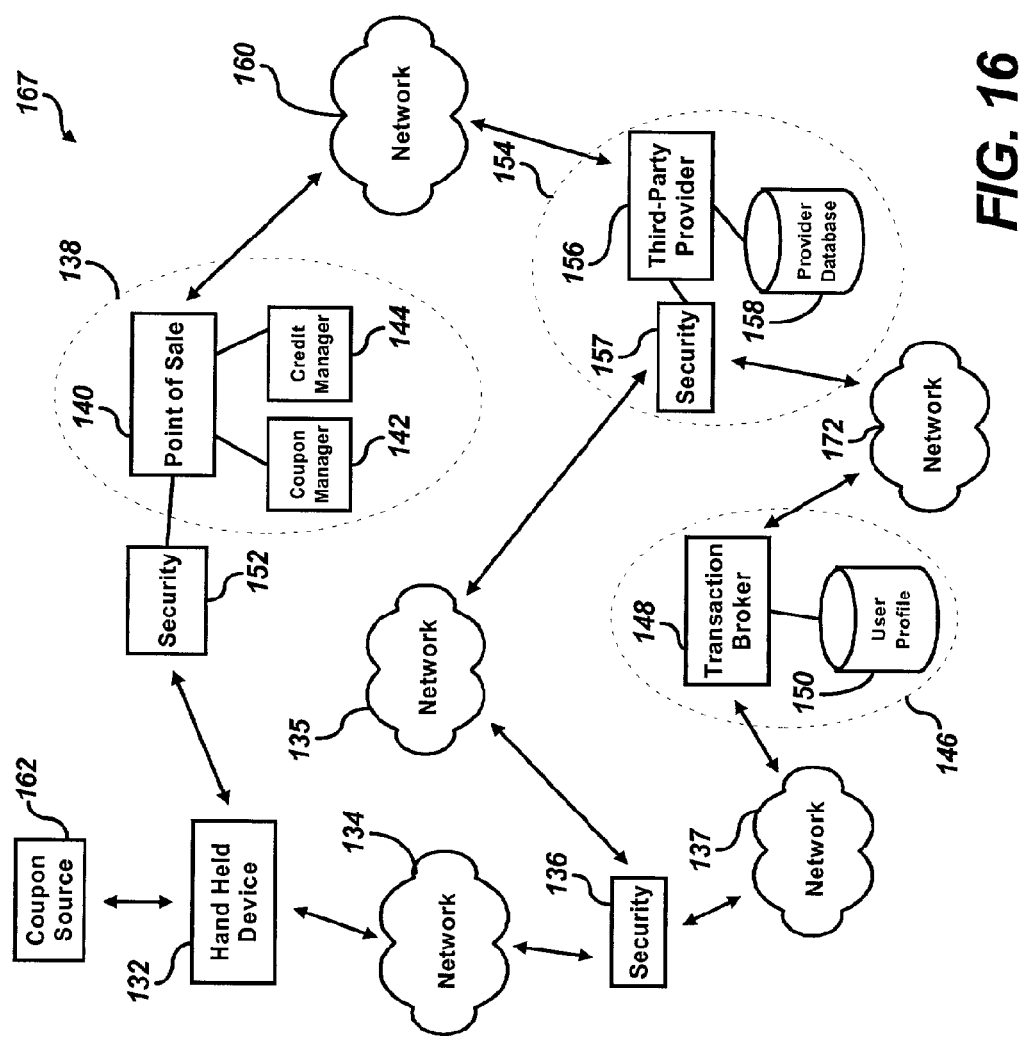
FIG. 16 illustrates an alternative system diagram illustrating an electronic coupon and credit management system, in accordance with preferred embodiments of the present invention.

FIG. 16 illustrates an alternative system diagram 167 illustrating an electronic coupon and credit management system, in accordance with preferred embodiments of the present invention. System diagram 167 of FIG. 16 is similar to system diagram 165 of FIG. 15, with the exception of a network located between security module 157 and transaction broker 148. Transaction broker 148 can thus communicate with third-party provider 156 through network 172 and security module 157 to retrieve instructions, coupon data, credit data, and other appropriate information from third-party provider 156. Such information can then be provided to a user of hand held device 162 by transaction broker 148. Again, network 172 may be configured as a dedicated network linking security module 157 to transaction broker 148, or network 172 may simply be a remote computer network, such as the Internet.

Figure 17:
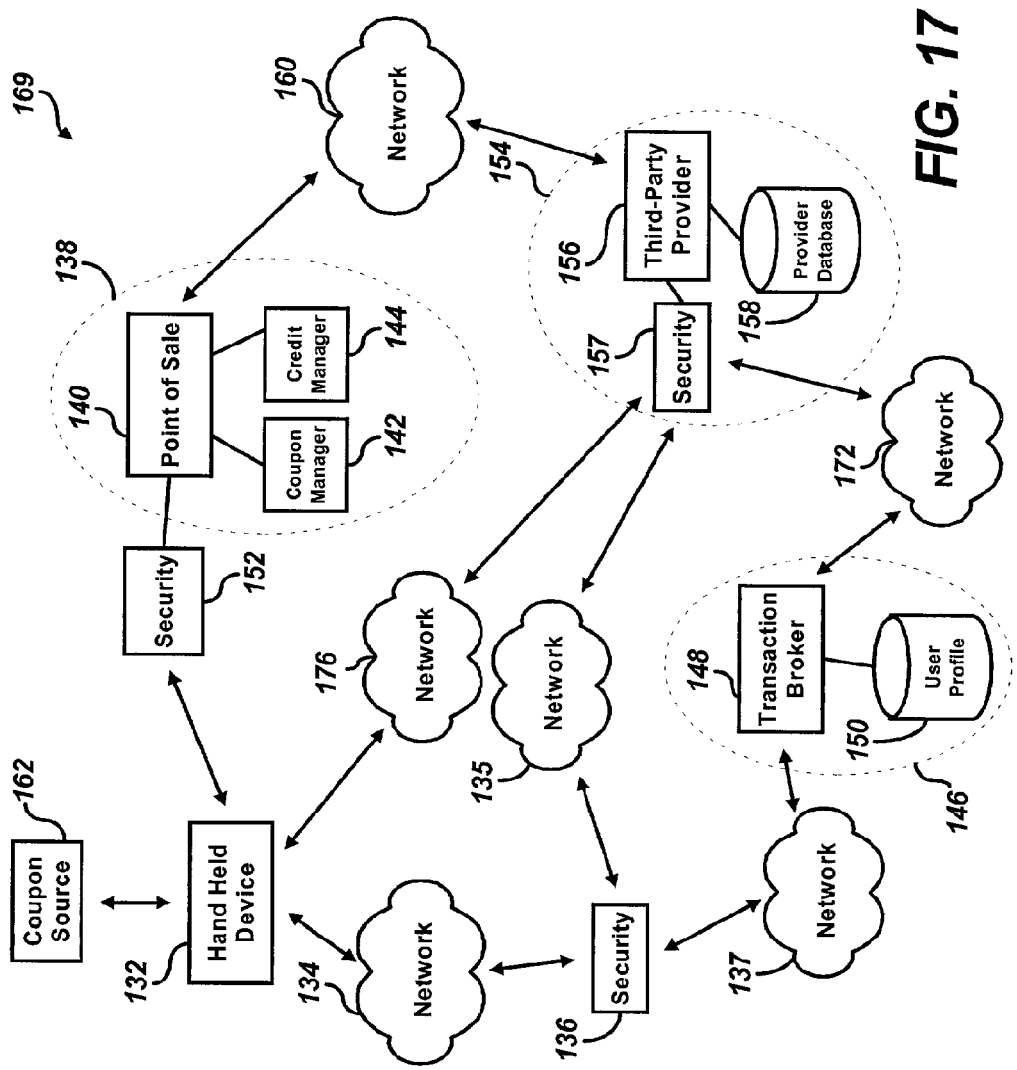
FIG. 17 depicts an alternative system diagram illustrating an electronic coupon and credit management system, in accordance with preferred embodiments of the present invention.

FIG. 17 depicts an alternative system diagram 169 illustrating an electronic coupon and credit management system, in accordance with preferred embodiments of the present invention. System diagram 169 of FIG. 16 is similar to system diagram 167 of FIG. 16 with the exception of an additional network 176 that permits hand held device 132 to communicate with third-party provider portion 154.

Network 176 may be configured as a dedicated network linked to security module 157. In such a case, network 176 may simply be a local network located at a third-party provider establishment or premises that can be accessed by hand held device 132. Network 176 may simply be the Internet from which hand held device 176 can download appropriate third-party provider information, including electronic coupons, credit information, and other third-party provider information retrieved by third-party provider 156 from provider database 158.

Figure 18:
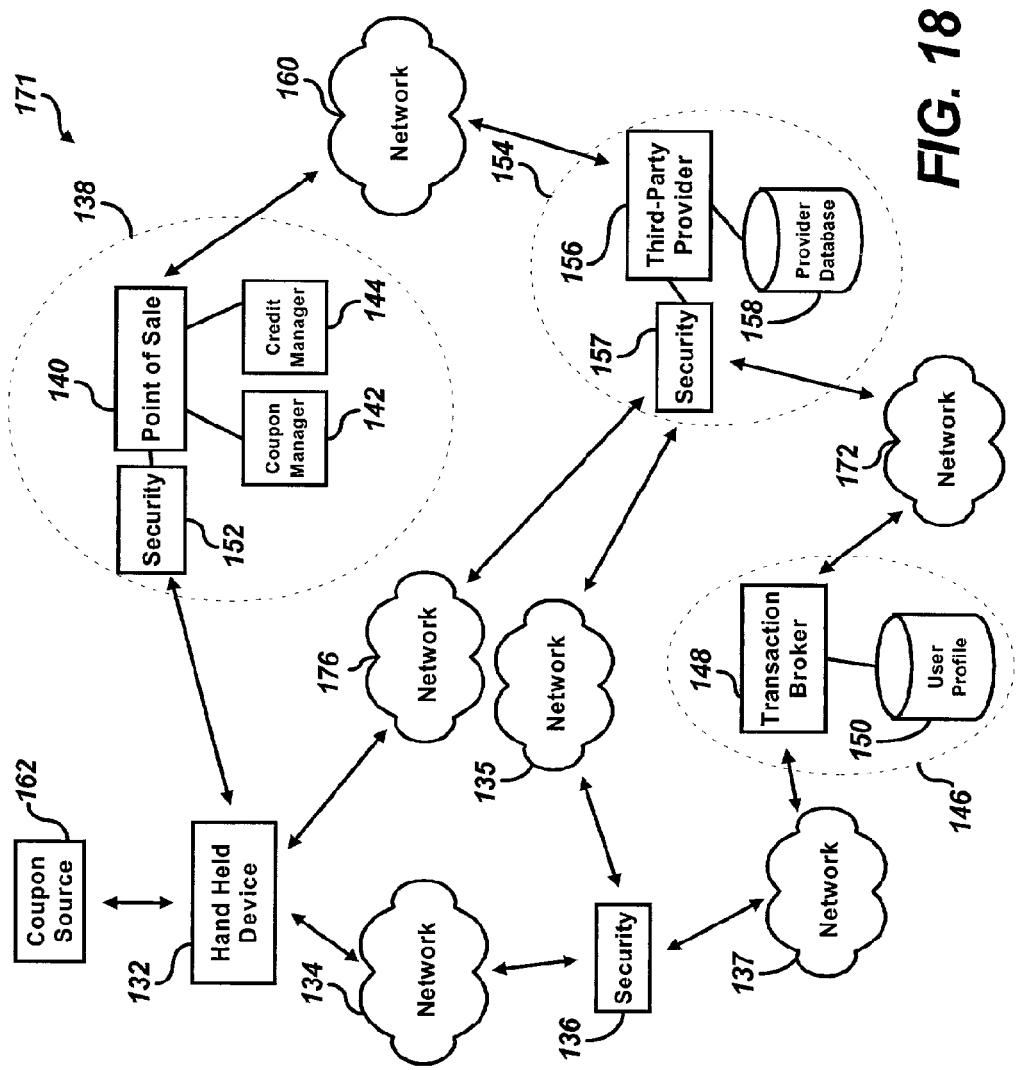
FIG. 18 illustrates an alternative system diagram illustrating an electronic coupon and credit management system, in accordance with preferred embodiments of the present invention.

FIG. 18 illustrates an alternative system diagram illustrating an electronic coupon and credit management system, in accordance with preferred embodiments of the present invention. System diagram 171 of FIG. 18 is similar to system diagram 169 of FIG. 17, with the exception that security module 152 may be located with the realm of retail portion 138.

In the previous illustrations, security module 152 was located outside the realm of retail portion 138 to indicate that the firewall or security arm of retail portion 138 can be configured at a location other than POS 140. For example, hand held device 152 may communicate with POS 140 through an electronic kiosk device located in a building or area away from the POS. Such an electronic kiosk device may be then linked via a network to POS 140. Alternatively, as illustrated in FIG. 18, security module 152 may be configured at the POS, depending on the needs or requirements of the retail establishment or enterprise operating POS 140.

Figure 19:
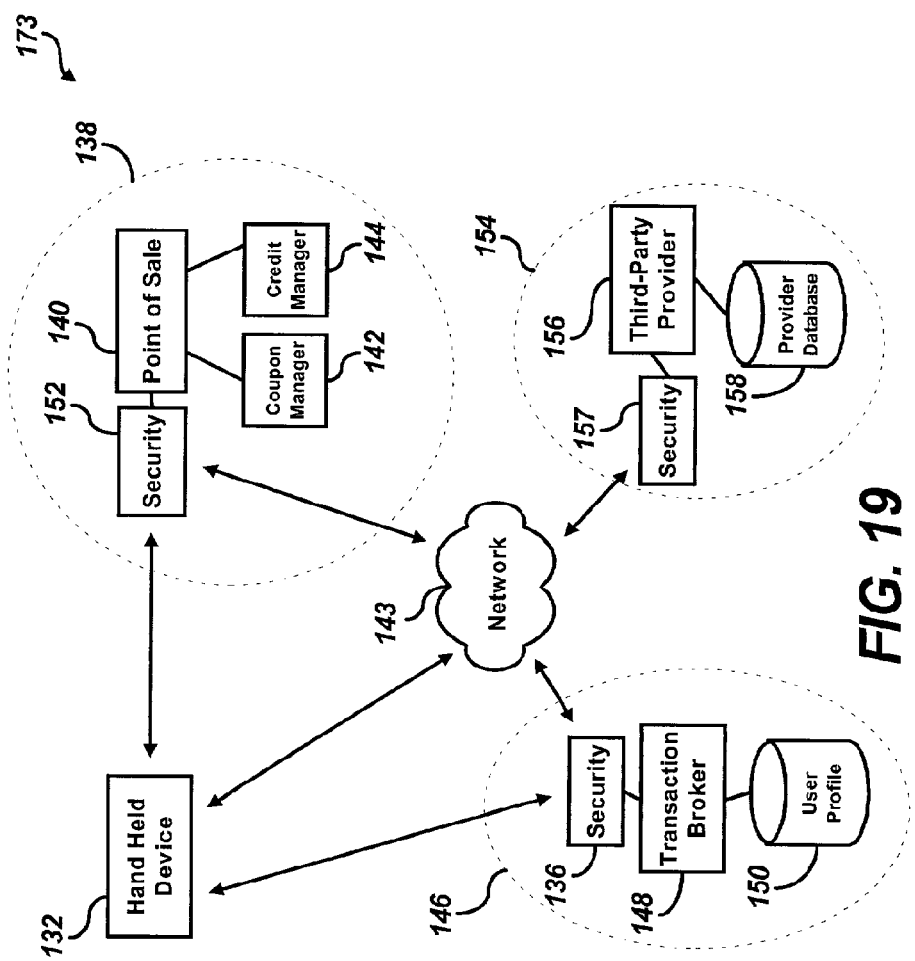
FIG. 19 depicts an alternative system diagram illustrating an electronic coupon and credit management system, in accordance with preferred embodiments of the present invention.

FIG. 19 depicts an alternative system diagram 173 illustrating an electronic coupon and credit management system, in accordance with preferred embodiments of the present invention. System diagram 173 differs from the previously illustrated system diagrams in the fact that the various portions that make up system diagram 173 and hence, the electronic coupon and credit management system described herein, can communicate with one another over a single network 143. Thus, transaction broker 148 can communicate with network 143 through security module 136.

Third-party provider can communicate with network 143 through security module 157. POS 140 can communicate with network 143 through security module 152. Hand held device 132 can communicate with transaction broker portion 146, third-party provider portion 154 and retail portion 138 through network 143. Those skilled in the art will appreciate that network 143 can be configured as a stand-alone dedicated network or a remote computer network, such as the Internet and associated World Wide Web, paging networks and other Wireless Intelligent Networks (WINs).

Figure 20:
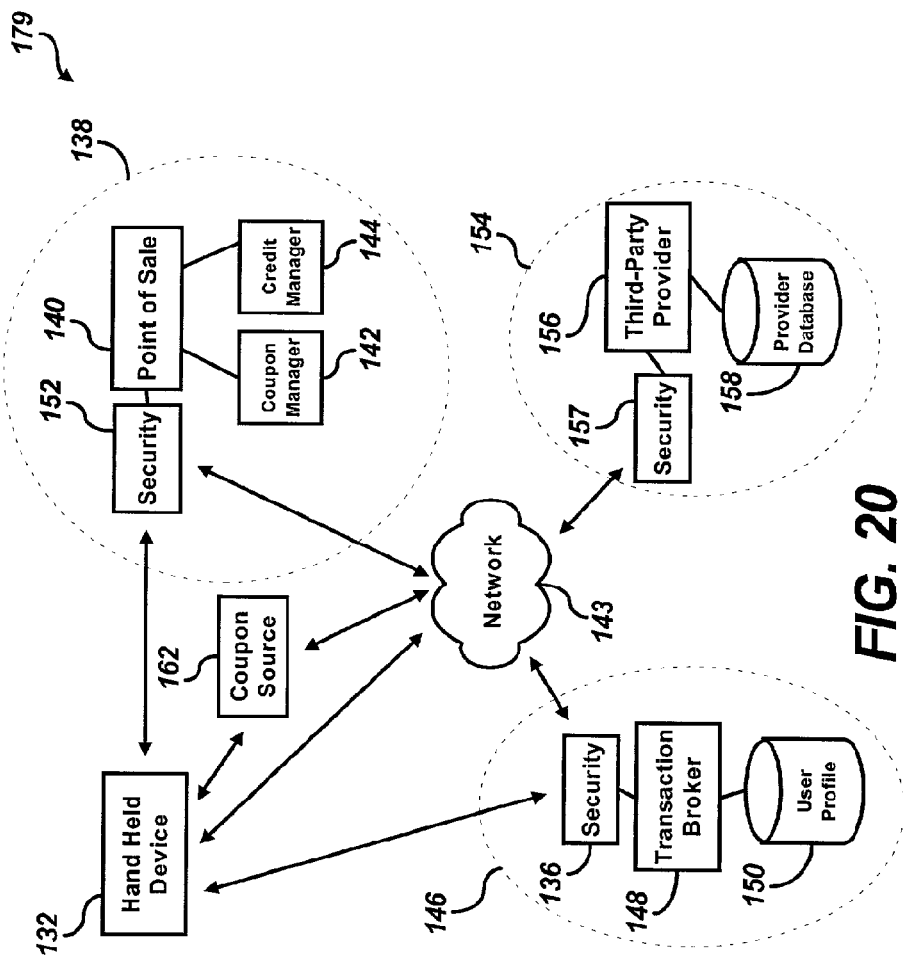
FIG. 20 illustrates an alternative system diagram illustrating an electronic coupon and credit management system, in accordance with preferred embodiments of the present invention.

FIG. 20 illustrates an alternative system diagram 176 illustrating an electronic coupon and credit management system, in accordance with preferred embodiments of the present invention. System diagram 179 is similar to system diagram 173 of FIG. 19, with the exception that a coupon source 162 may be located between hand held device 132 and network 143 to illustrate the fact that coupons can be retrieved and stored in hand held device 132 from a coupon source 162 associated with network 143 or simply linked to network 143. Again, coupon source 162 may be configured as a web site from which coupon and credit data may be retrieved. Such a web site can be associated with transaction broker 146 and/or third-party provider 156 and/or POS 140 or retail portion 138.

Figure 21:
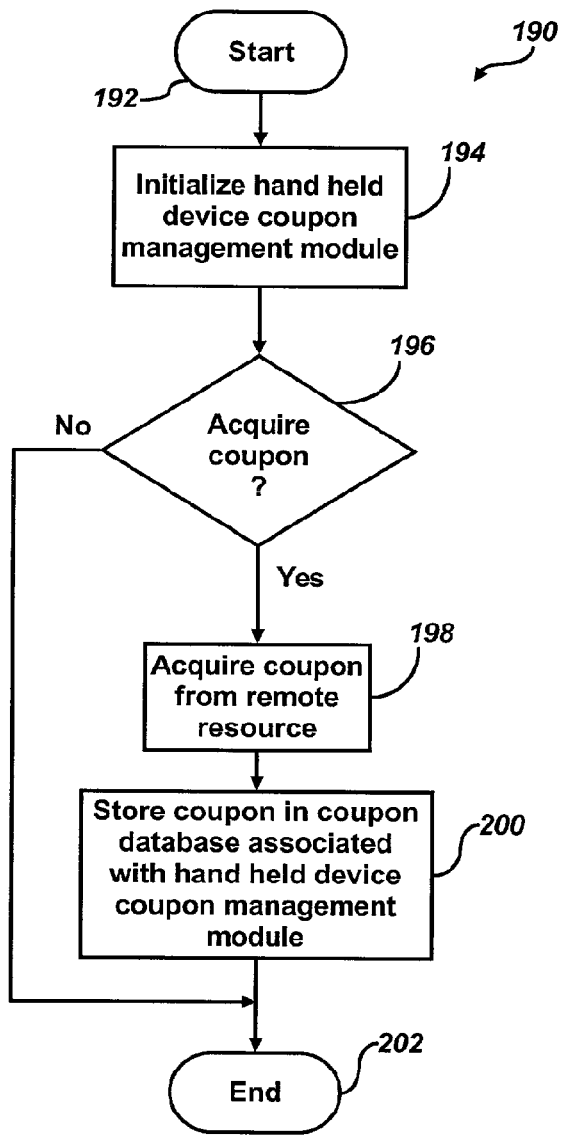
FIG. 21 depicts a flow-chart of operations illustrating general procedural steps for implementing hand held device operations, in accordance with preferred embodiments of the present invention.

FIG. 21 depicts a flow-chart of operations 190 illustrating general procedural steps for implementing hand held device operations, in accordance with preferred embodiments of the present invention. As illustrated at block 192, the process may be initiated. A hand held device, such as the hand held devices described and illustrated herein, maintains a coupon management module that instructs a CPU, such as CPU 10 of FIG. 1, to manage the handling of coupon data received by or transmitted from the hand held device. Such a module can be configured as a software module that may be processed at the hand held device, and stored in a memory unit in the hand held device.

As illustrated at decision block 196, a decision may be made, in response to initialization of the hand held device coupon management module, to determine if a coupon should be acquired by the hand held device. If it is determined not to acquire a coupon, the process terminates, as illustrated thereafter at block 202. If it is determined, however, to acquire a coupon, then as depicted next at block 198, a coupon in the form electronic coupon data may be acquired from a remote source. Thereafter, as described at block 200, the coupon may be stored in a database in the hand held device associated with the hand held device coupon module. The process then terminates, as indicated at block 202. It should be apparent after the present teachings that a decision to acquire coupons may be made manually by the user or automatically by the hand held device based on the user's profile, thereby relieving the user of manual coupon acquisition functions.

Figure 22:
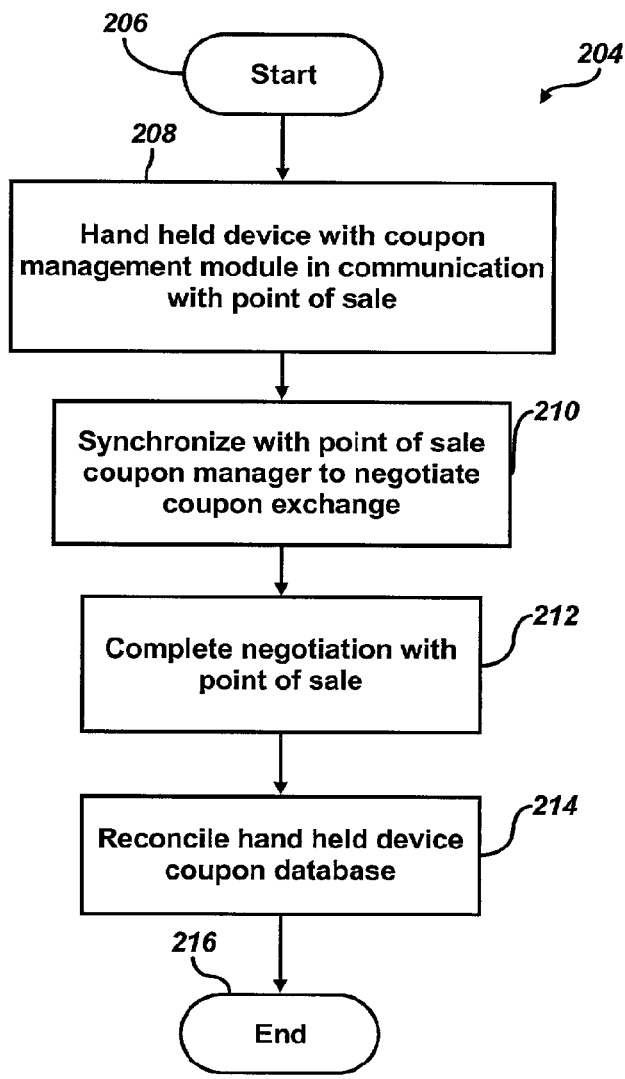
FIG. 22 illustrates a flow-chart of operations illustrating detailed procedural steps for implementing hand held device operations, in accordance with preferred embodiments of the present invention.

FIG. 22 illustrates a flow-chart of operations 205 illustrating detailed procedural steps for implementing hand held device operations, in accordance with preferred embodiments of the present invention. As illustrated at block 206, the process may be initiated. As depicted thereafter at block 208, a hand held device having a coupon management module integrated therein communicates with a POS. Thereafter, as depicted at block 210, the hand held device may be synchronized with the POS coupon manager to negotiate a coupon exchange.

It is important to distinguish between the POS coupon manager and the coupon management module integrated or associated with the hand held device. The POS coupon manager is analogous to coupon manager 142 illustrated in FIG. 20. The coupon management module described above is incorporated with the hand held device and functions as a coupon management module for the hand held device. When negotiation of the coupon exchange may be then completed, as indicated at block 212, thereafter, as depicted at block 214, a coupon database associated with the hand held device is reconciled and may also be updated with new coupons. Reconciliation operations remove used coupons and may add new ones to the device.

Figure 30:
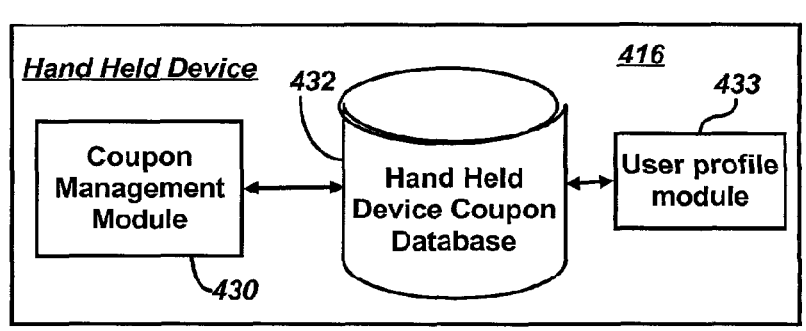
FIG. 30 illustrates a block diagram of a hand held device, in accordance with preferred embodiments of the present invention.

Coupons utilized during the coupon exchange are deleted from such a coupon database. Again, such a hand held device coupon database may be distinguished from a POS associated coupon database, such as, for example, coupon database 82 of FIG. 8. Coupon database 82 of FIG. 8 operates in association with a POS. The hand held device coupon database described above may be integrated with the hand held device and stores coupon information and related coupon data in the hand held device itself. The process then terminates, as described at block 216. FIG. 30 herein illustrates the interaction of a coupon database and coupon management module associated with a hand held device.

Figure 23:
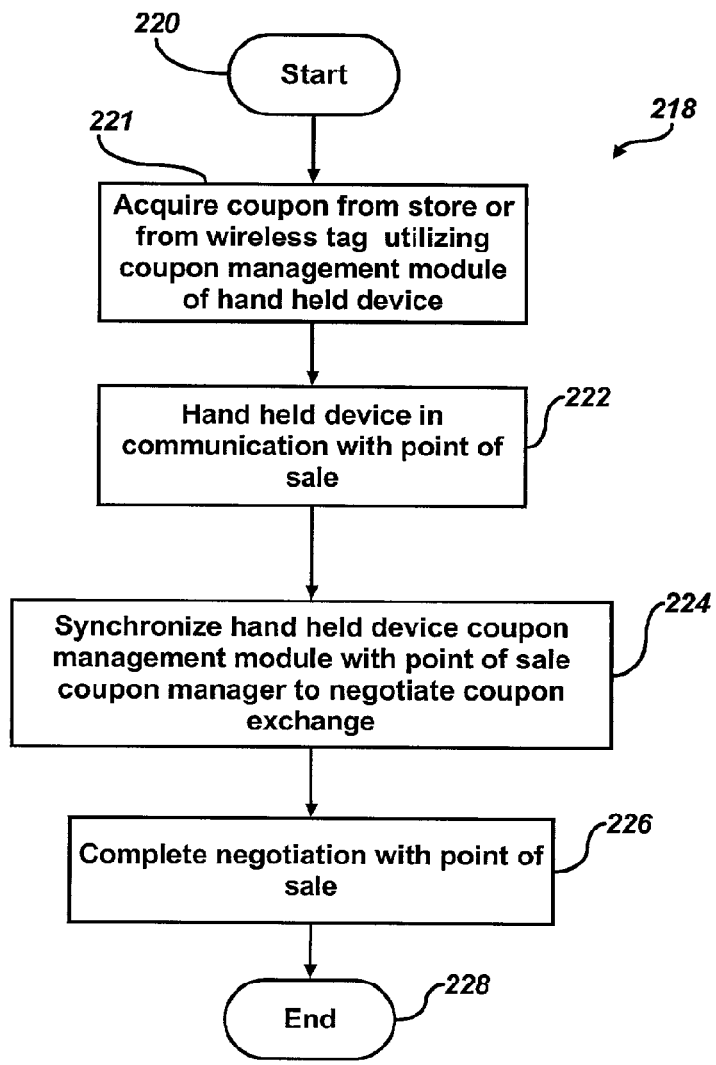
FIG. 23 depicts a flow-chart of operations illustrating additional procedural steps for carrying out hand held device operations, in accordance with preferred embodiments of the present invention.

FIG. 23 depicts a flow-chart of operations 218 illustrating additional procedural steps for carrying out hand held device operations, in accordance with preferred embodiments of the present invention. As indicated at block 220, the process may be initiated. As described thereafter at block 218, a coupon in the form electronic coupon data can be acquired from a store or retail establishment directly through a docking station or through wireless means, such as, for example, a wireless tag.

Acquisition of such coupon data is generally handled through the coupon management module associated with the hand held device (e.g., refer to FIG. 30). Thereafter, the hand held device can communicate with a POS, as indicated at block 222. The hand held device coupon management module may be synchronized with the POS associated coupon manager to negotiate a coupon exchange, as depicted at block 224. Negotiation with the POS can be then completed, as described at block 226. The process then terminates, as indicated at block 228.

Figure 24:
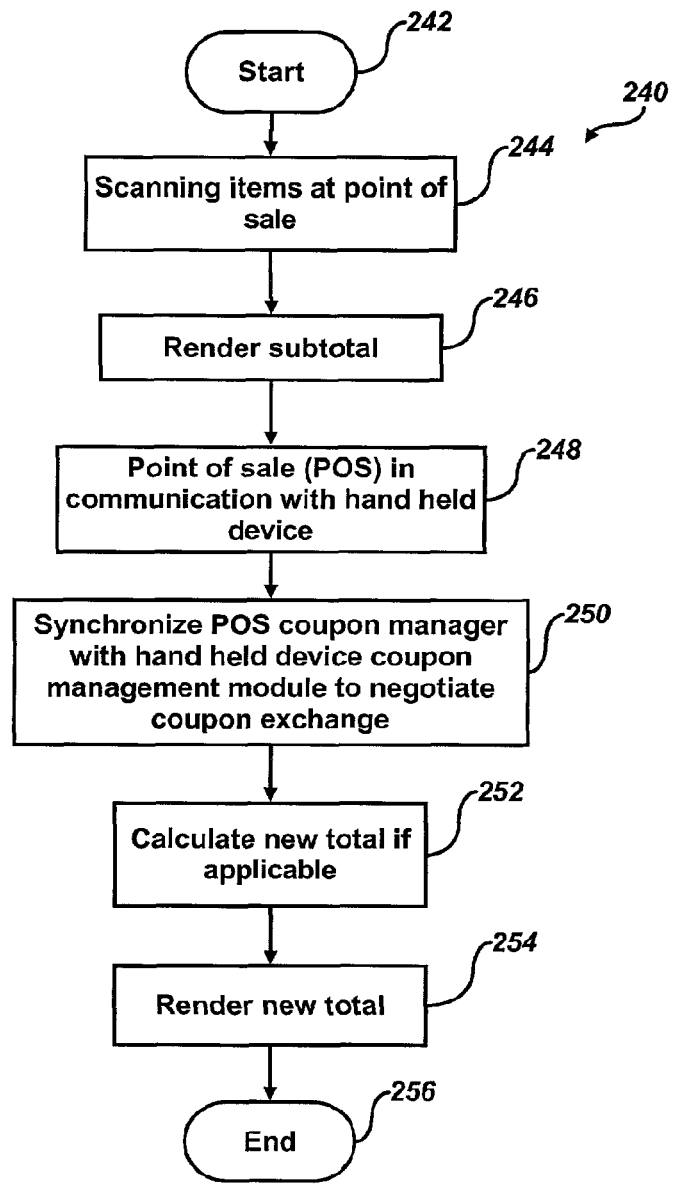
FIG. 24 illustrates a flow-chart of operations illustrating procedural steps for carrying out point of sale (POS) operations, in accordance with preferred embodiments of the present invention.

FIG. 24 illustrates a flow-chart of operations 240 illustrating procedural steps for carrying out point of sale (POS) operations, in accordance with preferred embodiments of the present invention. The process can be initiated, as indicated at block 242, and thereafter, as depicted at block 244, purchased items are scanned at the POS utilizing a scanning device, such as scanner 86 of FIG. 5 to FIG. 12. A subtotal can be then rendered, as indicated at block 246.

The POS can communicate with the hand held device, as illustrated at block 248, the POS associated coupon manager can be thereby synchronized with the hand held device coupon management module to negotiate a coupon exchange, as indicated at block 250. If applicable, a new total can be calculated, as depicted at block 254, based on the subtraction of coupon discounts from the rendered subtotal. A new total can be then rendered, as illustrated at 254, which reflects any price discounts associated with the coupon data synchronized and negotiated during the coupon exchange between the hand held device and the POS. The process then terminates, as described at block 256.

Figure 25:
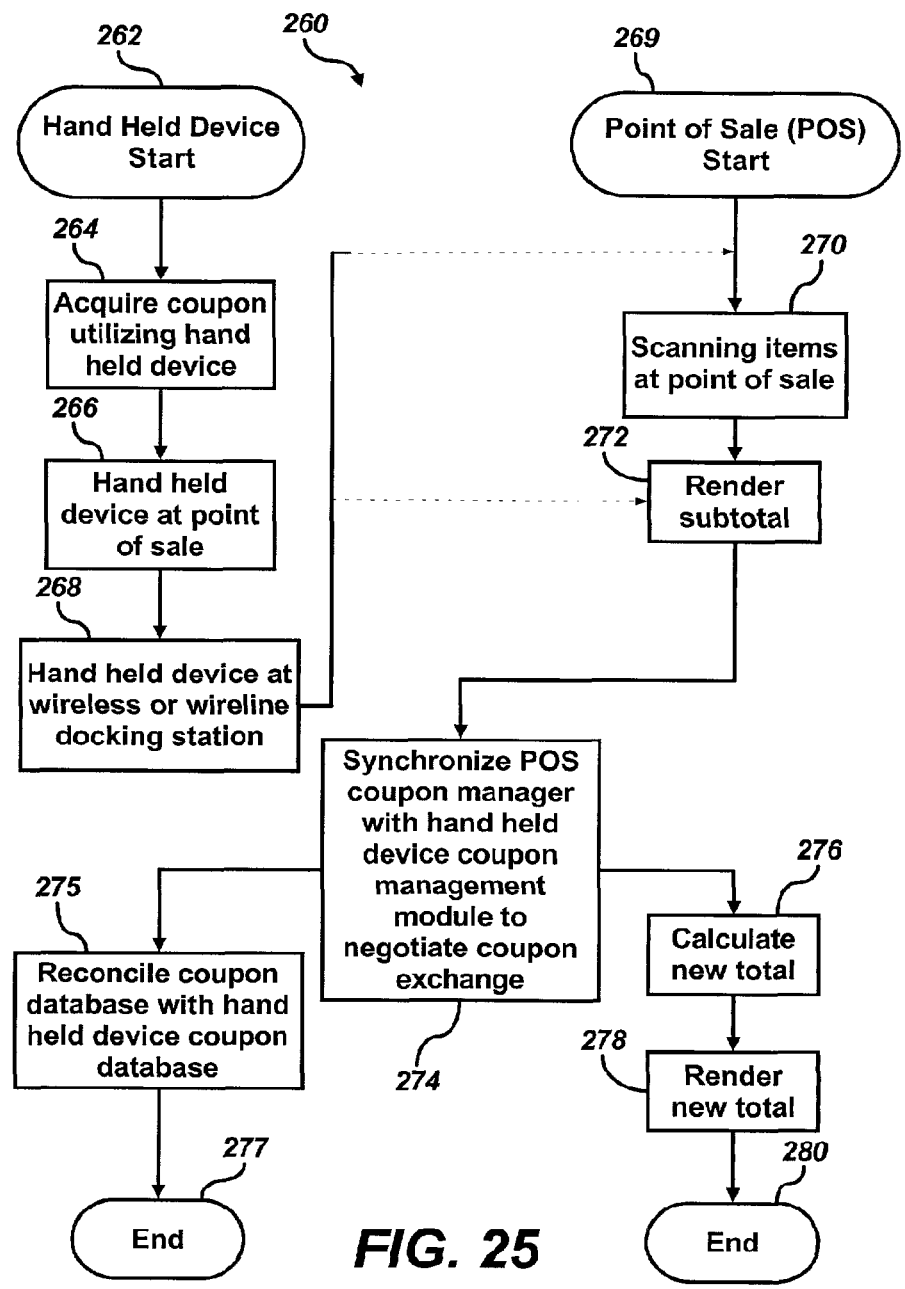
FIG. 25 depicts a flow-chart of operations illustrating procedural steps for carrying out both hand device and point of sale (POS) operations, in accordance with preferred embodiments of the present invention.

FIG. 25 depicts a flow-chart of operations 260 illustrating procedural steps for carrying out both hand device and point of sale (POS) operations, in accordance with preferred embodiments of the present invention. Hand held device operations are initiated, as illustrated at block 262. POS operations are initiated, as indicated at block 269. As depicted at block 264, electronic coupons are the acquired by the hand held device. The hand held device can be then taken to the POS during an item purchase, as illustrated at block 266.

At the POS, the hand held device communicates with the POS by wireless transmission of data or through a dedicated wireline docking station linked with, for example, a cash register/scanning system. As depicted next at block 270, items to be purchased at the retail establishment are scanned at the POS. Thereafter, a subtotal can be rendered, as depicted at block 272. Those skilled in the art can appreciate that such operations may be performed in alternative ordering, as indicated by the dashed connecting arrows in FIG. 25.

Following completion of the operation illustrated at block 272, the POS coupon manager (e.g., coupon manager 83 of FIG. 8) can be synchronized with the hand held device coupon management module (e.g., coupon management module 430 of FIG. 30) to negotiate the coupon exchange. Thereafter, as indicated at block 276 the POS coupon database (e.g., coupon database 82 of FIG. 8) can be reconciled with the hand held device coupon database (e.g., hand held device coupon database 432 of FIG. 30). Hand held device operations then terminate, as illustrated at block 277.

Following completion of the operation described at block 274, a new total can be calculated which takes into account subtracted discounts based on coupons provided to the POS from the hand held device. The new total can be then rendered on, for example, a display screen of a cash register and/or the hand held device itself, as illustrated at block 278. POS operations for the transaction can be then terminated, as depicted at block 280.

Figure 26:
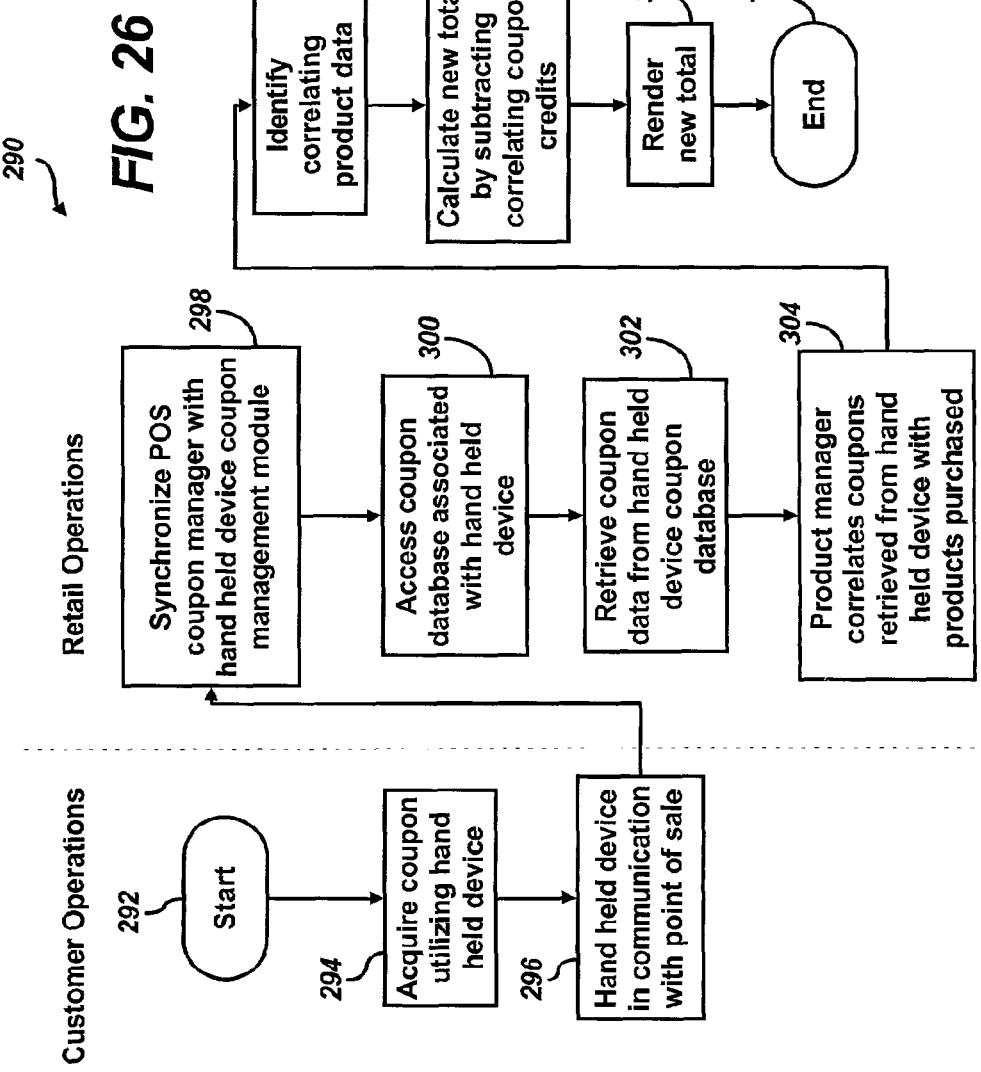
FIG. 26 illustrates a flow-chart of operations illustrating procedural steps for carrying out customer and retail operations, in accordance with preferred embodiments of the present invention.

FIG. 26 illustrates a flow-chart of operations 290 illustrating procedural steps for carrying out customer and retail operations, in accordance with preferred embodiments of the present invention. A dashed line depicted in FIG. 26 separates customer operations from retail operations in attempt to distinguish between operations that primarily involve the hand held device and operations primarily involving the retail establishment and POS. Thus, as depicted at block 292, the process can be initiated. Thereafter, as described at block 294, a user utilizing a hand held device acquires a coupon.

The hand held device can be then placed in communication with the POS, as indicated at block 296. As illustrated next at block 298, The POS coupon manager can be synchronized with the hand held device coupon management module. Thereafter, as depicted at block 300, a coupon database associated with the hand held device (e.g., hand held device coupon database 432 of FIG. 30 and FIG. 31) can be accessed. Coupon data can be then retrieved from the hand held device coupon database, as illustrated at block 302.

Next, as indicated at block 304, a product manager correlates coupons retrieved from the hand held device with products scanned and to be purchased at the POS. An example of such a product manager is product manager 87 of FIG. 8. Correlating product data can be then identified, as indicated at block 306, and thereafter, as illustrated at block 308, a new total can be calculated by subtracting correlating coupon data. A new total can be then rendered, as described at block 310. The process then ends, as illustrated at block 312.

Figure 27:
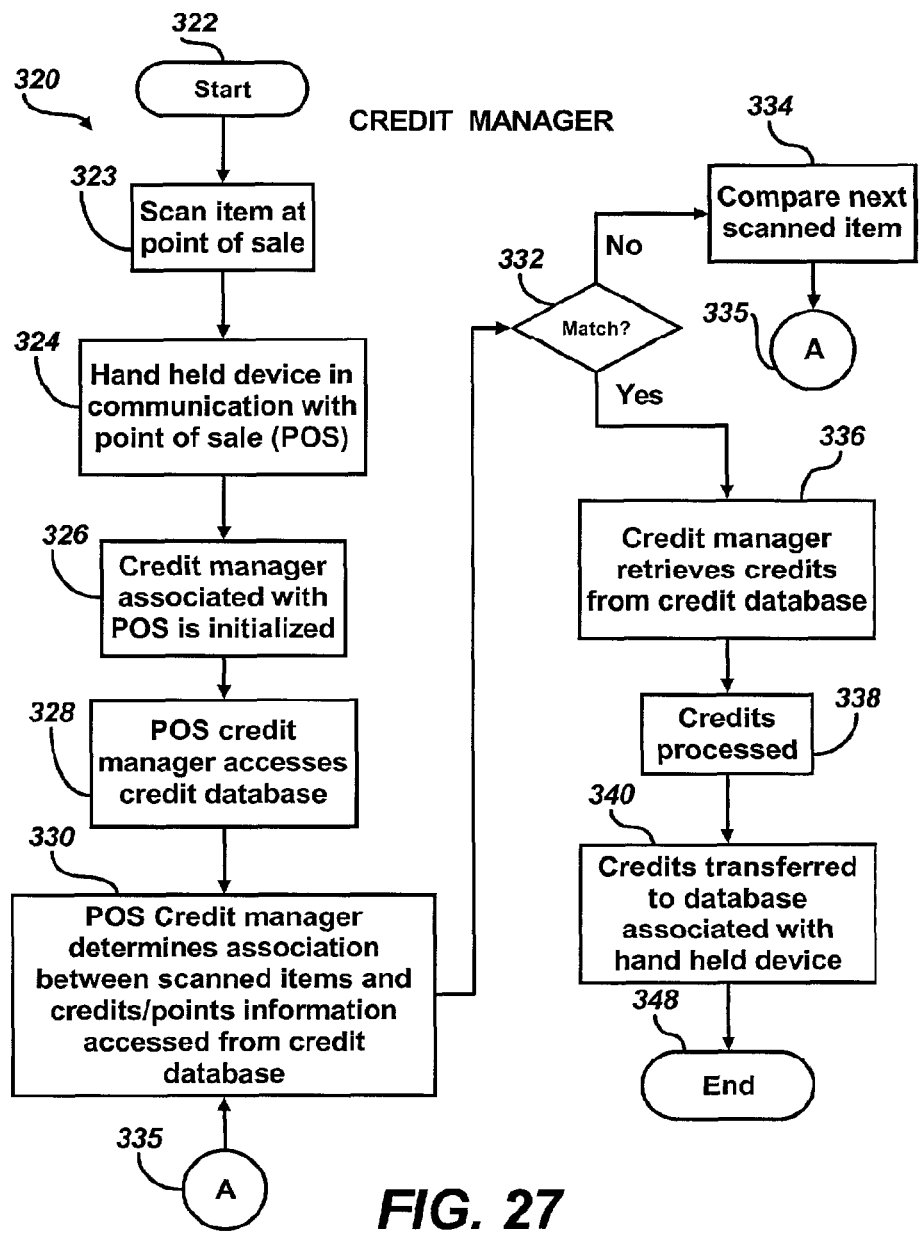
FIG. 27 depicts a flow-chart of operations illustrating steps for implementing a credit manager module, in accordance with preferred embodiments of the present invention.

FIG. 27 depicts a flow-chart of operations 320 illustrating steps for implementing a credit manager module, in accordance with preferred embodiments of the present invention. An example of such a credit manager is credit manager 144 of FIG. 5 to FIG. 12. A credit manager module (or simply "credit manager") can be initiated, as illustrated at block 322. An item or product to be purchased can be scanned at the POS, as illustrated at block 323. A hand held device can be in communication with the POS, as indicated at block 324 and thereafter, as depicted at block 326, the credit manager associated with the POS (e.g., credit manager 85 of FIG. 8) can be initialized.

In response to initialization of the credit manager, as indicated at block 328, the POS credit manager accesses a credit database (e.g., credit database 81 of FIG. 8). As illustrated next at block 330, the POS credit manager determines associations between scanned items and credit information, including credits or points, accessed from the credit database. Thereafter, as depicted at decision block 332, it must be determined if any matches are made between scanned items and credits/points accessed from the credit database.

If a match is not found for a particular scanned item, then as depicted at block 324, a comparison must be performed again, as illustrated via connecting symbol 335 and block 330. If, however, a match is identified, the credit manager retrieves credits/points from the credit database, as described at block 336. The credits are then processed, as illustrated at block 338, and thereafter transferred, as described at block 340, to a credit database associated with the hand held device. Such a hand held device credit database may be integrated with the hand held device itself. The process can be then terminated, as illustrated at block 348.

Figure 28:
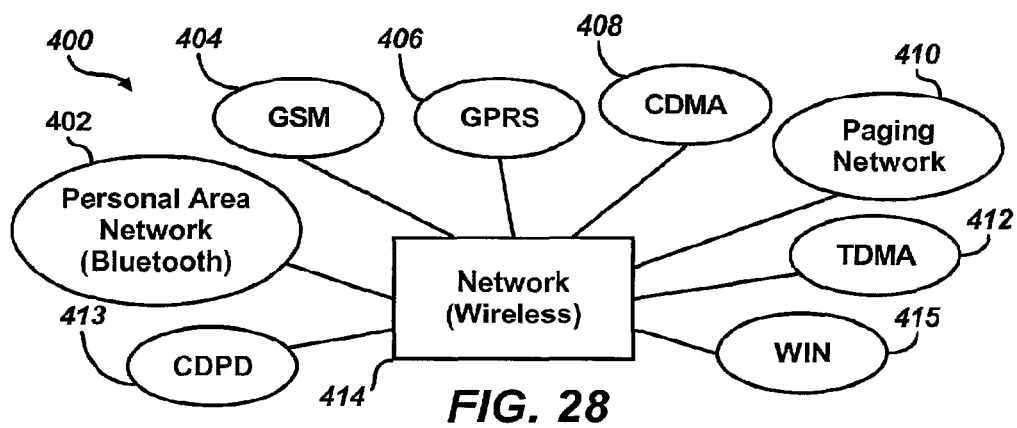
FIG. 28 illustrates an entity diagram illustrating possible attributes for a wireless network, in accordance with preferred embodiments of the present invention.

FIG. 28 illustrates an entity diagram 400 illustrating possible attributes for a wireless network, in accordance with preferred embodiments of the present invention. Those skilled in the art can appreciate that wireless network 414 may be utilized in place of or in association with network 143 of FIG. 19 and FIG. 20. Such a wireless network can be utilized to permit a hand held device, such as hand held device 132 of FIG. 20 to communicate with a POS, third-party provider and/or a transaction broker.

Those skilled in the art can further appreciate that a variety of possible wireless communications and networking configurations may be utilized to implement wireless network 414. Wireless network 414 may be, for example, implemented according to a variety of wireless protocols, including satellite, cellular, and direct RF or IR communications. Satellite communications, for example, well known in the art and can be implemented in combination with a network. A hand held device can communicate with a POS, third-party provider of coupons/credits, retail establishment, or transaction broker to acquire, transmit, and negotiate coupon exchanges through wireless network 414. Wireless network 414 can be implemented as a single network type (e.g., Bluetooth) or a network based on a combination of network types (e.g., GSM, CDMA, etc).

Wireless network 414 can be configured as a CDPD (Cellular Digital Packet Data) network 413, well-known in the networking arts. CDPD can be a TCP/IP based technology that supports Point-to-Point (PPP) or Serial Line Internet Protocol (SLIP) wireless connections to mobile devices, such as the hand held devices described and illustrated herein. Cellular service is generally available throughout the world from major service providers. Data can be transferred over switched PSTN circuits or packet-switched network utilizing CDPD protocols.

Current restrictions of CDPD are not meant to limit the range or implementation of the method and system described herein, but are described herein for illustrative purposes only. It is anticipated that CDPD will be continually developed, and that such new developments can be implemented in accordance with the present invention.

Wireless network 414 can be also configured as a Personal Area Network 402 or Bluetooth, as described herein. Bluetooth was adopted by a consortium of wireless equipment manufacturers referred to at the Bluetooth Special Interest Group (BSIG), and has emerged as a global standard for low cost wireless data and voice communication. Current specifications for this standard call for a 2.4 GHz ISM frequency band. Bluetooth technology is generally based on a short-range radio transmitter/receiver built into small application specific circuits (ASICS) and embedded into support devices, such as the hand held devices described and illustrated herein.

The Bluetooth standard permits up to 100 mw of power, which can increase the range to 100 M. In addition, Bluetooth can support up to three voice channels. Utilizing short data packets and frequency hopping of up to 1600 hops per second, Bluetooth is a wireless technology that can be utilized to enable the implementation of the method and system described herein. Current restrictions of Bluetooth are not meant to limit the range or implementation of the present invention, but are described herein for illustrative purposes only. It is anticipated Bluetooth will be continually developed, and that such new developments can be implemented in accordance with the present invention.

Wireless network 414 can also be configured as a GSM network 404. GSM (Global System for Mobile Communication) and PCS (Personal Communications Systems) networks, both well-known in the telecommunications arts, generally operate in the 800 MHz, 900 MHz, and 1900 MHz range. PCS initiates narrowband digital communications in the 900 MHz range for paging, and broadband digital communications in the 1900 MHz band for cellular telephone service. In the United States, PCS 1900 is equivalent to GSM 1900. GSM operates in the 900 MHz, 1800-1900

MHz frequency bands, while GSM 1800 is widely utilized throughout Europe and many other parts of the world.

In the United States, GSM 1900 is equivalent to PCS 1900, thereby enabling the compatibility of these two types of networks. Current restrictions of GSM and PCS are not meant to limit the range or implementation of the present invention, but are described herein for illustrative purposes only. It is anticipated that GSM and PCS will be continually developed, and that such new developments can be implemented in accordance with the present invention.

Wireless network 414 can be also implemented as a GPRS network 406. GPRS technology, well-known in the telecommunications arts, bridges the gap between current wireless technologies and the so-called "next generation" of wireless technologies referred to frequently as the third-generation or 3G wireless technologies. GPRS is generally implemented as a packet-data transmission network that can provide data transfer rates up to 115 Kbps. GPRS can be implemented with CDMA and TDMA technology and supports X.25 and IP communications protocols, all well-known in the telecommunications arts. GPRS also enables features, such as Voice over IP (VOIP) and multimedia services. Current restrictions of GPRS are not meant to limit the range or implementation of the present invention, but are described herein for illustrative purposes only. It is anticipated that GPRS will be continually developed and that such new developments can be implemented in accordance with the present invention.

Wireless network 414 can be implemented as a CDMA network 408. CDMA (Code Division Multiple Access) is a protocol standard based on IS-95 CDMA, also referred to frequently in the telecommunications arts as CDMA-1. IS-95 CDMA is generally configured as a digital wireless network that defines how a single channel can be segmented into multiple channels utilizing a pseudo-random signal (or code) to identify information associated with each user. Because CDMA networks spread each call over more than 4.4 trillion channels across the entire frequency band, it is much more immune to interference than most other wireless networks and generally can support more users per channel.

Currently, CDMA can support data at speeds up to 14.4 Kbps. Wireless network 414 can also be configured with a form of CDMA technology known as wideband CDMA (W-CDMA). Wideband CDMA is also referred to as CDMA 2000 in North America. W-CDMA can be utilized to increase transfer rates utilizing multiple 1.25 MHz cellular channels. Current restrictions of CDMA and W-CDMA are not meant to limit the range or implementation of the present invention, but are described herein for illustrative purposes only. It is anticipated that CDMA and W-CDMA will be continually developed and that such new developments can be implemented in accordance with the present invention.

Wireless network 414 can be also implemented as a paging network 410. Such paging networks, well-known in the telecommunications arts, can be implemented in accordance with the present invention to enable transmission or receipt of data over the TME/X protocol, also well-known in the telecommunications arts. Such a protocol enables notification in messaging and two-way data coverage utilizing satellite technology and a network of base stations geographically located throughout a particular geographical region. Paging network 410 can be configured to process enhanced messaging applications.

Unified messaging solutions can be utilized in accordance with wireless network 414 to permit carriers and Internet service providers to manage customer e-mail, voice messages and fax images and can facilitate delivery of these communications to PDAs, telephony devices, pagers, personal computers and other capable information retrieval devices, wired or wireless.

Current restrictions of such paging networks are not meant to limit the range or implementation of the present invention, but are described herein for illustrative purposes only. It is anticipated that such paging networks, including those based on the TME/X protocol, will be continually developed and that such new developments can be implemented in accordance with the present invention.

Wireless network 414 can also be configured as a TDMA network 412. TDMA (Time Division Multiple Access) is a telecommunications network utilized to separate multiple conversation transmissions over a finite frequency allocation of through-the-air bandwidth. TDMA can be utilized in accordance with the present invention to allocate a discrete amount of frequency bandwidth to each user in a TDMA network to permit many simultaneous conversations or transmission of data. Each user is assigned a specific timeslot for transmission. A digital cellular communications system that utilizes TDMA typically assigns 10 timeslots for each frequency channel.

A hand held device operating in association with a TDMA network sends bursts or packets of information during each timeslot. Such packets of information are then reassembled by the receiving equipment into the original voice or data/information components. Current restrictions of such TDMA networks are not meant to limit the range or implementation of the present invention, but are described herein for illustrative purposes only. It is anticipated that TDMA networks will be continually developed and that such new developments can be implemented in accordance with the present invention.

Wireless network 414 can also be configured as a WIN (Wireless Intelligent Network) 415. WIN is generally known as the architecture of the wireless switched network that allows carriers to provide enhanced and customized services for mobile telephones. Intelligent wireless networks generally include the use of mobile switching centers (MSCs) having access to network servers and databases such as Home Location Registers (HLRs) and Visiting Location Registers (VLR5), for providing applications and data to networks, service providers and service subscribers (wireless device users).

Local number portability allows wireless subscribers to make and receive calls anywhere-regardless of their local calling area. Roaming subscribers are also able to receive more services, such as call waiting, three-way calling and call forwarding. A HLR is a database that contains semipermanent mobile subscriber (wireless device user) information for wireless carriers' entire subscriber base.

HLR subscriber information includes identity, service subscription information, location information (the identity of the currently serving VLR to enable routing of communications), service restrictions and supplementary services/information. HLRs handle SS7 transactions in cooperation with Mobile Switching Centers and VLR nodes, which request information from the HLR or update the information contained within the HLR.

The HLR also initiates transactions with VLRs to complete incoming calls and update subscriber data. Traditional wireless network design is based on the utilization of a single HLR for each wireless network, but growth considerations are prompting carriers to consider multiple HLR topologies.

The VLR is also a database that contains temporary information concerning the mobile subscribers currently located in a given MSC serving area, but whose HLR is elsewhere. When a mobile subscriber roams away from the HLR location into a remote location, SS7 messages are used to obtain information about the subscriber from the HLR, and to create a temporary record for the subscriber in the VLR.

Signaling System No. 7 (referred to as SS7 or C7) is a global standard for telecommunications. In the past the SS7 standard has defined the procedures and protocol by which network elements in the public switched telephone network (PSTN) exchange information over a digital signaling network to effect wireless and wireline call setup, routing, control, services, enhanced features and secure communications. Such systems and standards may utilized to implement wireless network 414, in accordance with the present invention.

Improved operating systems and protocols allow Graphical User Interfaces (GUIs) to provide an environment that displays user options (e.g., graphical symbols, icons or photographs) on a wireless device's screen. Extensible Markup Language ("XML") is a currently available standard that performs as a universal language for data, making documents more interchangeable. XML allows information to be used in a variety of formats for different devices, including PCs, PDAs and web-enabled mobile phones.

XML enables documents to be exchanged even where the documents were created and/or are generally used by different software applications. XML may effectively enable one system to translate what another systems sends. As a result of data transfer improvements, wireless device GUIs can be utilized in accordance with a hand held device and wireless network 414, whether configured as a paging network or another network type, to render images on the hand held device that closely represent the imaging capabilities available on desktop computing devices.

Figure 29:
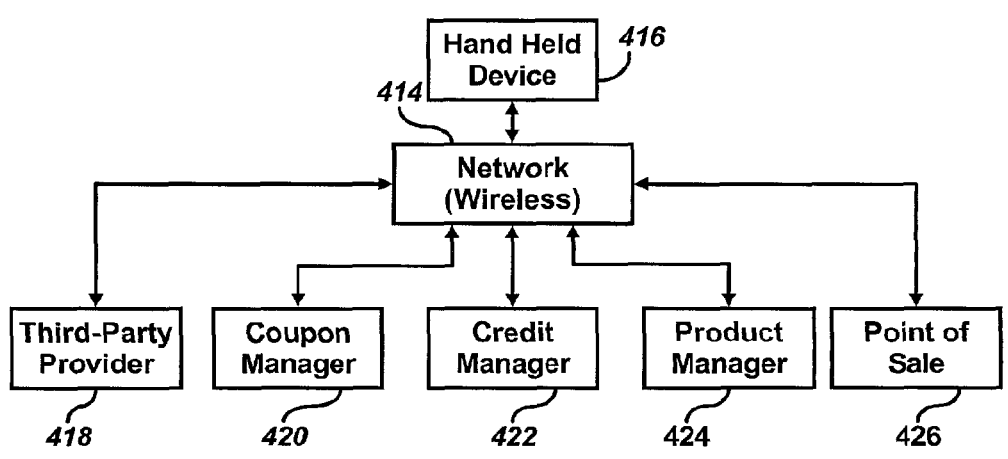
FIG. 29 depicts a block diagram illustrating the interaction of a wireless network, a hand held device, and cash management modules, in accordance with preferred embodiments of the present invention.

FIG. 29 depicts a block diagram 416 illustrating the interaction of wireless network 414, a hand held device 416, and cash management modules, in accordance with preferred embodiments of the present invention. Cash management modules include a third-party provider 418, coupon manager 450, credit manager 422, product manager 424 and POS 426. Wireless network 414 of FIG. 29 is analogous to wireless network 414 of FIG. 28. In FIG. 28 and FIG. 29, like parts are indicated by identical reference numerals.

FIG. 30 illustrates a block diagram of a hand held device 416, in accordance with preferred embodiments of the present invention. Hand held device 416 includes a coupon management module 430, which can communicate with a hand held device coupon database 432. Hand held device 416 of FIG. 30 is analogous to hand held device 416 of FIG. 29 and the other hand held devices described and illustrated herein, such as hand held device 11 of FIG. 1. Thus, in FIGS. 30 and 31, like parts are indicated by like reference numerals.

A user profile associated with coupon management module 430 may be stored within hand held device coupon database 432 or may be provided as a separate user profile module 433. Again, the user profile may be used to filter out unwanted coupons during hand held device synchronization with network-based coupon providers (e.g., brokers, third-party providers) or the POS. User profiling enables more personalized, targeted couponing exchanges with a use of hand held device 416. Use of a profile may allow a user to retrieve targeted (profile matching) coupons automatically from any coupon providing sources achieving communication with the hand held device 416.

Figure 31:
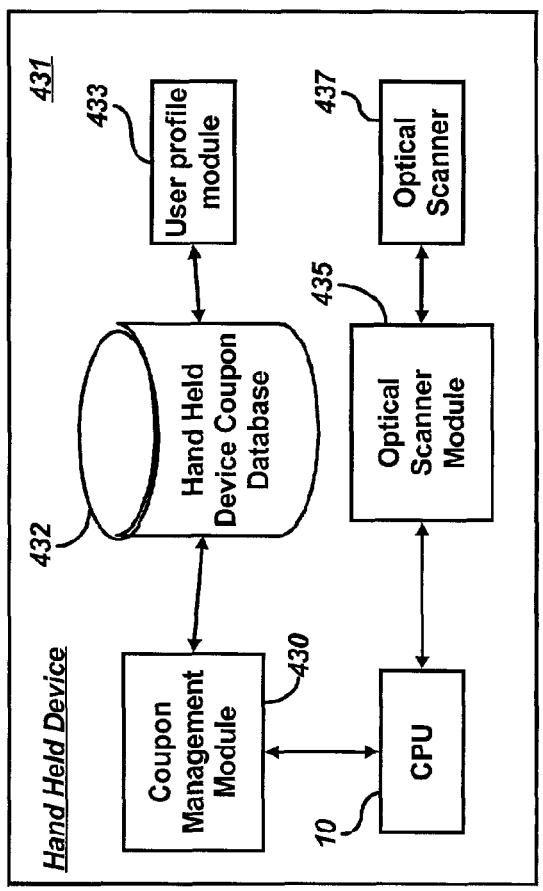
FIG. 31 depicts a block diagram of a hand held device configured with an optical scanner module and optical scanner, in accordance with preferred embodiments of the present invention.

FIG. 31 depicts a block diagram 439 of a hand held device 431 configured with an optical scanner module 435 and optical scanner 437, in accordance with preferred embodiments of the present invention. Hand held device 431 is analogous to hand held device 416 of FIG. 30. Hand held device 431 includes a CPU 10. CPU 10 of FIG. 31 is analogous to CPU 10 of FIG. 1. Those skilled in the art will appreciate that although CPU 10 is not depicted in FIG. 30, hand held device 416 of FIG. 30 operates in association with such a CPU.

Thus, FIG. 30 and FIG. 31 are merely high level representations of a hand held device. Optical scanner module 435 functions as scanning software for optical scanner 437 and communicates with CPU 10 and coupon management module 430 to retrieve and store coupon data (i.e., electronic coupons) from static references, such as a bar code. Thus, those skilled in the art can appreciate that optical scanner 437 may be configured as a bar code reader.

Optical scanner 437 may also be configured as an optical scanner that retrieves images. For example, optical scanner 437 can scan an image such as a photograph or other graphical representation from a static reference source, such as a magazine or newspaper, and store such information within a database in hand held device 431.

If such graphical representations contain coupon data therein or graphical representations of coupons, such graphical representations can be stored within hand held device coupon database 432 as coupon data. Optical scanner 437 may also be implemented as a holographic scanner for scanning and retrieving holographic representations embedded as holograms or holographic representations on newspapers, magazines, cloth, etc.

Figures 32, 33:
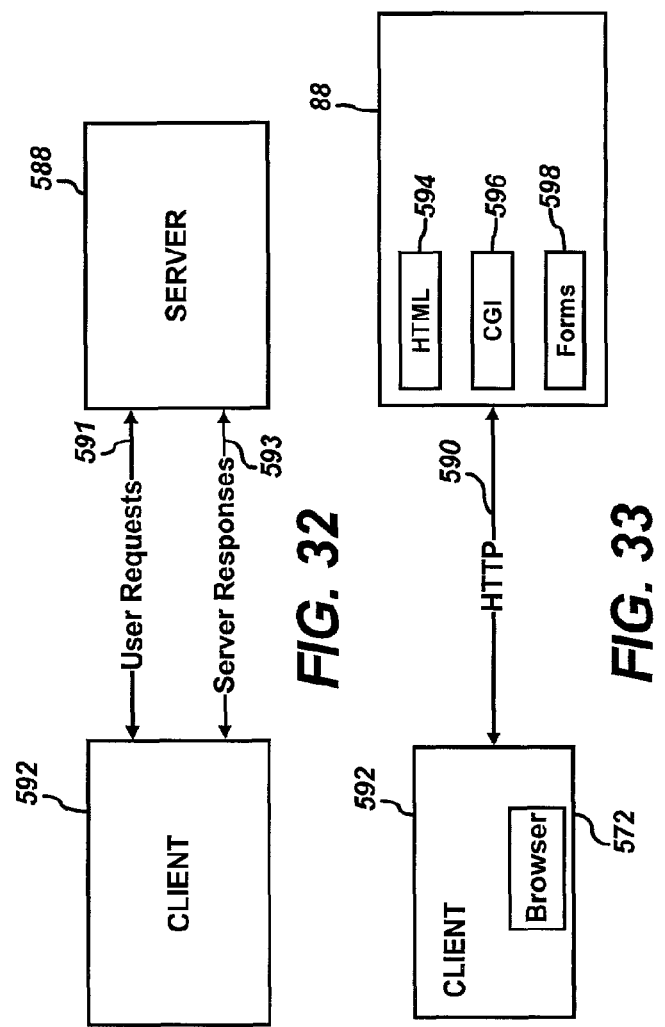
FIG. 32 illustrates a block diagram illustrative of a client/server architecture, in accordance with preferred embodiments of the present invention.
FIG. 33 depicts a detailed block diagram of a client/server architecture in accordance with preferred embodiments of the present invention.

The networks described herein can be configured also as a client/server architecture, such as the Internet, to permit users to acquire coupons or communicate with third-party providers, transaction brokers, or the retail establishment and engage in coupon exchanges initiated from the hand held device. Thus, for example, network 143 of FIG. 19 and FIG. 20 can be configured as such a client/server architecture. FIGS. 31 to 33 describe a network based on a client/server architecture that can be utilized in association with the present invention.

Figure 34:
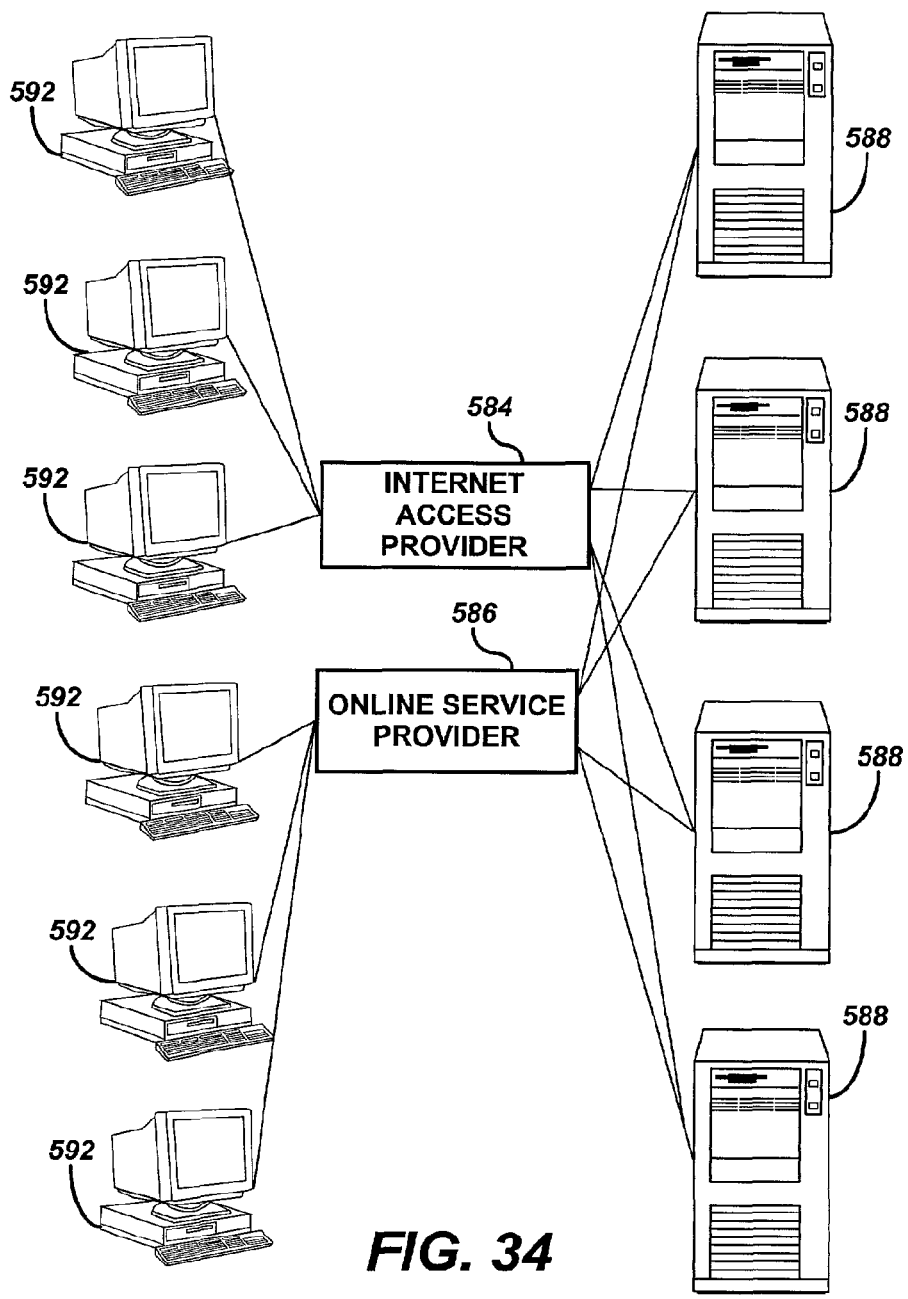
FIG. 34 illustrates a block diagram of a computer network in which a preferred embodiment of the present invention can be implemented.

In FIG. 32, FIG. 33, and FIG. 34, like parts are indicated by identical reference numerals. FIG. 31 illustrates a block diagram illustrative of a client/server architecture in accordance with preferred embodiments of the present invention. In FIG. 31, user requests 591 for data are sent by a client application program 592 to a server 588. Server 588 can be a remote computer system accessible over the Internet or other communication networks. Client application program 592 may be utilized in association with a hand held device.

Server 588 performs scanning and searching of raw (e.g., unprocessed) information sources (e.g., newswire feeds or news groups) and, based upon these user requests, presents the filtered electronic information as server responses 593 to the client process. The client process may be active in a first computer system, and the server process may be active in a second computer system, communicating with one another over a communications medium, thus providing distributed functionality and allowing multiple clients to take advantage of the information-gathering capabilities of the server.

FIG. 32 illustrates a detailed block diagram of a client/server architecture in accordance with preferred embodiments of the present invention. Although the client and server are processes that are operative within two computer systems, these processes being generated from a high-level programming language (e.g., PERL), which can be interpreted and executed in a computer system at runtime (e.g., a workstation), it can be appreciated by one skilled in the art that they may be implemented in a variety of hardware devices, either programmed or dedicated.

Client 592 and server 588 communicate utilizing the functionality provided by HTTP. Active within client 592 can be a first process, browser 572, which establishes connections with server 588, and presents information to the user. Any number of commercially or publicly available browsers can be utilized in various implementations in accordance with the preferred embodiment of the present invention. For example, a browser, such as Netscape™, can provide the functionality specified under HTTP. "Netscape" is a trademark of Netscape, Inc.

Server 588 executes the corresponding server software, which presents information to the client in the form of HTTP responses 590. The HTTP responses 590 correspond with the Web pages represented using HTML, or other data generated by server 588. Server 588 provides HTML 594. With certain browsers, a Common Gateway Interface (CGI) 596 can be also provided, which allows the client program to direct server 588 to commence execution of a specified program contained within server 588. This may include a search engine that scans received information in the server for presentation to the user controlling the client.

By utilizing this interface, and HTTP responses 590, server 588 may notify the client of the results of that execution upon completion. Common Gateway Interface (CGI) 596 can be one form of a gateway, a device utilized to connect dissimilar networks (i.e., networks utilizing different communications protocols) so that electronic information can be passed from one network to the other. Gateways transfer electronic information, converting such information to a form compatible with the protocols used by the second network for transport and delivery.

In order to control the parameters of the execution of this server-resident process, the client may direct the filling out of certain "forms" from the browser. This can be provided by the "fill-in-forms" functionality (i.e., forms 598), which can be provided by some browsers, such as the Netscape-brand browser described herein. This functionality allows the user via a client application program to specify terms in which the server causes an application program to function (e.g., terms or keywords contained in the types of stories/articles, which are of interest to the user). This functionality can be an integral part of the search engine.

FIG. 34 is a diagram illustrative of a computer network, which can be implemented in accordance with preferred embodiments of the present invention. Computer network is representative of the Internet, which can be described as a known computer network based on the client-server model discussed herein. Conceptually, the Internet includes a large network of servers 588 that are accessible by clients 592, typically users of personal computers, through some private Internet access provider 584 (e.g., such as Internet America) or an on-line service provider 586 (e.g., such as America On-Line, Prodigy, Juno, and the like).

Each of the clients 592 may run a browser to access servers 88 via the access providers. Each server 588 operates a so-called "Web site" that supports files in the form of documents and web pages. A network path to servers 88 is identified by a Universal Resource Locator (URL) having a known syntax for defining a network collection. Computer network 580 can thus be considered a Web-based computer network.

Those skilled in the art can appreciate that the hand held devices discussed herein may be modified to incorporate other computer-based and processing features. For example, a hand held device utilized in accordance with the present invention, may be configured with so-called "smart card" technology. Smart cards are generally known in the art as credit-card sized plastic cards with an embedded computer chip. The chip can either be a microprocessor with internal memory or a memory chip with non-programmable logic. The chip connection can be configured via direct physical contact or remotely through a contactless electromagnetic interface.

Smart cards may be generally configured as either a contact or contactless smart card, or a combination thereof. A contact smart card requires insertion into a smart card reader with a direct connection to a conductive micromodule on the surface of the card. Such a micromodule is generally gold plated. Transmission of commands, data, and card status takes place through such physical contact points.

A contactless card requires only close proximity to a reader. Both the reader and the card may be implemented with antenna providing a contactless link that permits the devices to communicate with one another. Contactless cards can also maintain internal chip power or an electromagnetic signal (e.g., RF tagging technology). Two additional categories of smart codes, well known in the art, which are based on contact and contactless cards are the so-called Combi cards and Hybrid cards.

A Hybrid card generally can be equipped with two chips, each with a respective contact and contactless interface. The two chips are not connected, but for many applications, this Hybrid serves the needs of consumers and card issuers. The Combi card can be generally based on a single chip and can be generally configured with both a contact and contactless interface.

Chips utilized in such smart cards are generally based on microprocessor chips or memory chips. Smart cards based on memory chips depend on the security of the card reader for their processing and can be utilized when low to medium security requirements. A microprocessor chip can add, delete and otherwise manipulate information in its memory. Microprocessor-based memory cards typically contain microprocessor chips with 8, 16, and 32 bit architectures.

Thus, a smart card in accordance with the method and system described herein would not serve to replace a hand held device, such as a PDA. The smart card would instead function as a supplementary feature of the PDA. The hand held device can be configured to operate in association with a smart card adapted for use with the hand held device. In the case of a PDA, for example, the smart card can retrieve coupon data form a contact or contactless interface. The data can be stored in a memory location with the smart card. The smart card can be then temporarily connected to the PDA through a cartridge or other hardware interface to allow coupon data to be transferred from the smart card to the PDA. The PDA can then transfer coupon data to a POS for processing and redemption, according to the method and system described herein.

Figure 35:
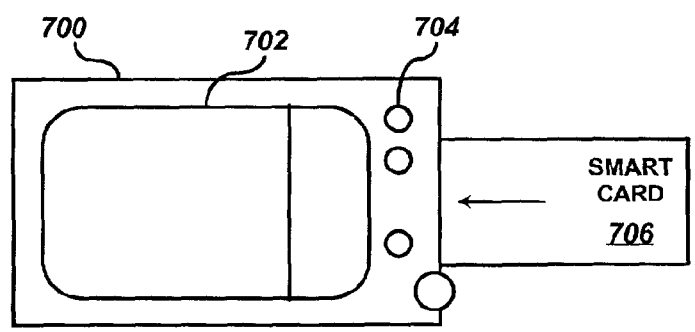
FIG. 35 depicts a top view of a hand held device and a smart card adapted for use with the hand held device, in accordance with preferred embodiments of the present invention.

FIG. 35 illustrates a top view of a hand held device 700 and a smart card 706 adapted for use with hand held device 700, in accordance with preferred embodiments of the present invention. Hand held device 700 may be configured as a PDA or other hand held device. For example, hand held device 700 is analogous to hand held device 11 of FIG. 1 and other hand held device embodiments described herein, such as hand held device 431 of FIG. 31. Hand held device 700 is thus equipped with a display unit 702 interfaced with user controls, such as user control 704.

Smart card 706 can be inserted through a slot in hand held device 700. Smart card 706 can be integrated with a recorder/writer for writing data to smart card 706 or reading data from smart card 706 or otherwise modifying a memory of smart card 706. Thus, smart card 706 can retrieve coupon data from hand held device 700 or transfer coupon data stored in a memory of smart card 706 to a memory location within hand held device 700, such as a hand held device coupon database.

Figure 36:
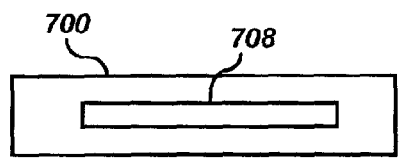
FIG. 36 depicts a side view of the hand held device depicted in FIG. 35 and a slot for inserting smart card into the hand held device, in accordance with preferred embodiments of the present invention.
Figure 37:
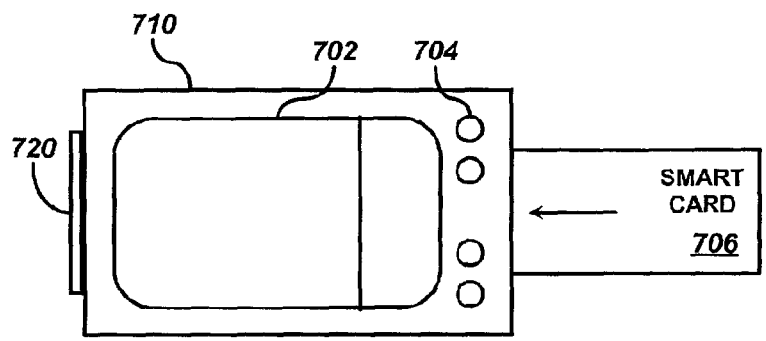
FIG. 37 illustrates a hand held device configured with a smart card adapted for use with the hand held device and a scanner integrated with the hand held device, in accordance with preferred embodiments of the present invention.

FIG. 36 depicts a side view of hand held device 700 depicted in FIG. 35 and a slot 708 for inserting smart card into hand held device 700, in accordance with preferred embodiments of the present invention. Slot 708 can be sized to receive smart card 706 into hand held device 700. FIG. 37 illustrates a hand held device 710 configured with smart card 706 adapted for use with hand held device 710 and a scanner 720 integrated with hand held device 710, in accordance with preferred embodiments of the present invention.

Hand held device 710 of FIG. 37 is analogous to hand held device 700 of FIGS. 35 and 36, the difference being that hand held device 710 includes scanner 720 for scanning or capturing images from static references or representations. Scanner 720 can thus be utilized by a user to retrieve electronic coupons graphically displayed on a static reference, such as a newspaper, magazine, or so forth. Scanner 720 can be configured as a bar code scanner for retrieving coded information associated with electronic coupon data.

Scanner 720 can be additionally configured as an optical scanner that captures graphical images representative of electronic coupons or associated coupon data. The captured information can be then processed and stored with a hand held device coupon database with hand held device 710. Scanner 720 can be also configured as a plug-in module, such as those utilized in the popular Handspring Visor PDA. Furthermore, a plug-in may be adapted to incorporate both a smart card read/write portal and scanning hardware and/or associated software. It should also be appreciated based on the teachings herein that a plug-in may be adapted to combine smart card reader/writer portal and RF communications capabilities in order to provide applications, such as remote wireless credit card verification.

Based on the foregoing, those skilled in the art can appreciate that methods and systems can be implemented according to the present invention. Generally, according to the method and system described herein, electronic coupons are processed through hand held devices. Initially, a POS can be synchronized with a hand held device having coupon and/or credit data therein. The redemption of electronic coupons at the POS can be managed through a coupon manager associated with a coupon database linked to the POS, in response to synchronizing the POS with the hand held device.

Electronic coupon in the form of coupon data can be retrieved from a hand held device coupon database within the hand held device. Coupon retrieval between a coupon management module associated with the hand held device and the coupon manager associated with the coupon database linked to the POS can thereafter be coordinated.

The coupon manager associated with the POS (i.e., the coupon database linked to the POS) can be synchronized with the coupon management module associated with the hand held device. At least one electronic coupon can be then transferred from the hand held device coupon database to the POS, in response to synchronizing the coupon manager with the coupon management module associated with the hand held device.

At least one item can be scanned from the POS. A product database associated with the POS can be accessed, wherein the product database contains product data therein.

A subtotal can be rendered for at least one item scanned, in response to scanning the item at the POS. Electronic coupons retrieved from the hand held device coupon database are then correlated with product data accessed from the product database and the item scanned at the POS. Thereafter, correlating product data and price discounts associated with the electronic coupons retrieved from the hand held device coupon database are identified.

A new total for the items scanned at the POS can be then calculated, in response to identifying correlating product data and price discounts associated with the electronic coupons retrieved from the hand held device coupon database. A new total can be then rendered in a display area of the hand held device.

The coupon manager can be generally permitted to communicate with a product manager associated with the product database. The coupon manager can be also permitted to communicate with a credit manager associated with a credit database linked to the POS. A user profile can be associated with the hand held device coupon database and/or the hand held device coupon management module.

The coupon manager may communicate with the POS through a network. Likewise, synchronization of the POS and the hand held device may occur through a network. Such a network may be configured as a wireless network and/or, for example, a client/server type network. The hand held device may be configured as a PDA, a wireless PDA, a pager, a WAP-enabled telecommunications device or other configurations thereof, such as a hand held device integrated with a smart card adapter.

A hand held device utilized in accordance with the present invention can be also configured with an optical scanner for retrieving, scanning, and/or capturing data from static references. Such a scanner may be configured, for example, as a bar code scanner that permits a user of the hand held device to retrieve coupon data from a static reference through the bar code scanner and thereafter store the coupon data in the hand held device coupon database within the hand held device. The optical scanner may also be implemented as a holographic image scanner for reading and capturing holographic-based images containing coupon data therein.

Based on the foregoing, those skilled in the art will appreciate that the present invention disclosed herein describes a method and system for processing negotiable economic credits through a hand held device in association with a third-party provider communicative with the hand held device. At least one negotiable economic credit can be transferred from a third-party provider communicative with the hand held device to the hand held device. Examples of such negotiable economic credits, as described herein, include coupons and credits thereof, such as frequent flyer miles offered by airlines and other organizations to attract and retain customers.

The negotiable economic credit can be stored within a memory of the hand held device for retrieval and processing at a POS associated with a retail establishment. The negotiable economic credit can be associated with a security module for protecting the privacy of the negotiable economic credit. A user profile can be compiled for utilization during the retrieval of the negotiable economic credit, in response to user input. The user profile can be stored in a database associated with the third-party provider and a database associated with the hand held device.

A negotiable economic credit or negotiable economic credits can be transferred from the third-party provider to the hand held device through a network that can be wireline, wireless or a combination thereof. Data can be transmitted through a wireless network through wireless communications, relying on telecommunications protocols, such as WAP, CDMA, Bluetooth, and so forth, as described herein.

The third-party provider can be permitted to communicate with a transaction broker so that negotiable economic credits may be redeemed by the hand held device at the POS. Examples of such third-party providers and transaction brokers are provider in FIGS. 19 and 20 as third-party provider 156 and transaction broker 148. According to an embodiment of the present invention, negotiable economic credits are processed through a hand held device.

At least one negotiable economic credit can be transferred to a retail enterprise for use at a POS on behalf of a credit redemption request by a hand held device. In addition the negotiable economic credit or credits can be transferred to a retail enterprise for use at a POS on behalf of a credit redemption request by a hand held device, in response to synchronization of the POS and the hand held device.

The negotiable economic credits can be redeemed at the POS, in response to transferring the negotiable economic credit or credits to the POS from the hand held device. Additionally, negotiable economic credits can be transferred to a retail enterprise for use at a POS, such as POS 140 of FIG. 19 and FIG. 20 on behalf of a credit redemption request by a hand held device, in response to a request by the retail enterprise to reward purchases at the POS.

A system for processing negotiable economic credits through a hand held device in association with a third-party provider communicative with the hand held device can be configured with a transfer module for transferring negotiable economic credits from a third-party provider communicative with the hand held device to the hand held device. The system can also be implemented with a storage module for storing negotiable economic credits within a memory of the hand held device for retrieval and processing at a POS.

The negotiable economic credits can be associated with a security module for protecting the privacy of transferred negotiable economic credits. Such a security module (e.g., security module 157 of FIGS. 19 and 20) can be configured with encryption/decryption and password protection features, well known in the art.

The system can be further configured with a user profile for utilization during retrieval of the negotiable economic credits, in response to user input. The user of the hand held device can register with the third-party provider to establish a user profile stored in a database. The user profile can be stored in a database, such as provider database 158 of FIG. 19 associated with third-party provider 156 and/or in another database, such as a database associated with a transaction broker (e.g., user profile database 150).

Those skilled in the art will appreciate that the third-party provider may be associated or linked to other databases or memory locations and that user profile data may be stored therein.

The system can be further configured with a storage module for storing the user profile in a database associated with the third-party provider (e.g., provider database 158). The system can also incorporate a storage module for storing the user profile in a database within the hand held device (e.g., user profile module 433 of FIG. 31).

The transaction broker can be permitted to communicate with the third-party broker so that such credits may be thereafter redeemed by the hand held device at the POS. This can be particularly advantageous to the user of the hand held device because the user of the hand held device can thus communicate directly with the third-party provider or the transaction broker if he or she so chooses, utilizing a hand held device.

The system can be further modified to include a transfer module for transferring at least one negotiable economic credit to a retail enterprise for use at a POS on behalf of a credit redemption request by a hand held device. Additionally, the system can be configured to operate in association with a transfer module for transferring negotiable economic credits to a retail enterprise for use at a POS on behalf of a credit redemption request by a hand held device, in response to synchronization of the POS and the hand held device.

Additionally, the system can be configured with a redemption module for redeeming negotiable economic credits at the POS, in response to transferring the negotiable economic credits to the POS from the hand held device. Furthermore, the system can be configured to include a transfer module for transferring negotiable economic credits to a retail enterprise for use at a POS on behalf of a credit redemption request by a hand held device, in response to a request by the retail enterprise to thereby reward purchases at a POS associated with the retail enterprise by a hand held device.

The POS itself may be configured, for example, in accordance with the methods and systems of the present invention, as a kiosk device. Such a kiosk device may comprise an internet or intranet enabled kiosk device and may include other capabilities as, for example, an ATM machine. A kiosk can be configured for example, as a freestanding computer or terminal that provides information to the public, usually through a multimedia display. The POS may actually comprise an ATM machine and/or the capabilities of an ATM machine. Additionally, the POS may be configured, for example, as or with the capabilities of a vending machine.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A device comprising:
   a processor;
   a wireless controller configured to transmit and receive data through a wireless data communication network; and
   a memory having instructions stored thereon that are executable by the processor to cause the device to perform operations comprising:
   transmitting a request, via the wireless controller, to a computer system that is communicatively coupled to the device, wherein the request is formatted to request issuance of a data structure corresponding to a user account;
   receiving the data structure, wherein the data structure encodes information indicative of a particular item of negotiable economic credit and further includes authentication information usable to authenticate the particular item of negotiable economic credit;
   detecting that a transaction has been initiated by a user for the device;

in response to the detecting, determining whether the data structure corresponds to the transaction;

based on the determining, sending, via the wireless controller, the information indicative of the particular item of negotiable economic credit and the authentication information to a point-of-sale (POS) device, and instructing the POS device to apply the particular item of negotiable economic credit to the transaction, wherein the POS device is one of a plurality of POS devices located in different establishments, and wherein the sending occurs while the device is physically within a wireless communication range of the POS device; and receiving, via the wireless controller, a message from the POS device that the particular item of negotiable economic credit has been authenticated and applied to the transaction.

2. The device of claim 1, further comprising an optical scanner, wherein the operations further comprise scanning an image using the optical scanner and decoding, from the image, information indicative of the request for issuance of the data structure.

3. The device of claim 1, wherein the operations further comprise: receiving, via the wireless controller, an electronic coupon customized for the user account.

4. The device of claim 1, wherein the device is a portable device.

5. The device of claim 1, wherein the operations further comprise:

responsive to the message indicating that the particular item of negotiable economic credit has been authenticated, removing the data structure corresponding to the particular item of negotiable economic credit from the device.

6. The device of claim 1, wherein the operations further comprise:

receiving, from the POS device, an indication that a transaction amount for the transaction should be adjusted based on an application of the particular item of negotiable economic credit.

7. The device of claim 1, wherein the data structure further comprises one or more of:

data representative of an identification number corresponding to the particular item of negotiable economic credit;

data representative of a vendor that authorized issuance of the particular item of negotiable economic credit;

data representative of an entity that will redeem the particular item of negotiable economic credit;

data representative of an issuer of the particular item of negotiable economic credit; or any combination thereof.

8. The device of claim 1, wherein the device further comprises an electronic reader, and wherein receiving the data structure is performed via the electronic reader.

9. The device of claim 1, wherein the device includes a display, and wherein the operations further comprise:

based on the message, displaying on the display, a transaction amount that has been adjusted based on authentication of the particular item of negotiable economic credit.

10. A method comprising:

an electronic, portable device transmitting, via a network connection, to a computer system, a request for issuing a data structure corresponding to an account associated with the electronic, portable device;

in response to the request, receiving, by the electronic, portable device, via the network connection, the data structure, wherein the data structure encodes information indicative of a particular item of negotiable economic credit and further includes authentication information usable to authenticate the particular item of negotiable economic credit;

detecting, by the electronic, portable device, that a transaction has been initiated by a user for the electronic, portable device;

in response to the detecting, the electronic, portable device transmitting, via the network connection, the information indicative of the particular item of negotiable economic credit and the authentication information to a point-of-sale (POS) device, and instructing the POS device to apply the particular item of negotiable economic credit to the transaction, wherein the POS device is one of a plurality of POS devices located in different establishments; and receiving, by the electronic, portable device, authentication information indicating that the particular item of negotiable economic credit has been authenticated by the POS device and applied to the transaction.

11. The method of claim 10, further comprising:

in response to receiving the authentication information, the electronic, portable device causing the particular item of negotiable economic credit to be removed from the account.

12. The method of claim 10, further comprising:

based on the authentication information, the electronic, portable device displaying a transaction amount that has been adjusted based on the particular item of negotiable economic credit.

13. The method of claim 10, further comprising:

the electronic, portable device storing, in a database included in the electronic, portable device, the information indicative of the particular item of negotiable economic credit that has been issued to the account.

14. The method of claim 10, further comprising scanning an image via an optical scanner of the electronic, portable device and decoding, from the image, information indicative of the request for issuing the data structure.

15. The method of claim 10, further comprising:

receiving, by the electronic, portable device, transaction information from the POS device over a wireless channel, wherein the transaction information indicates that the transaction has been initiated by the user.

16. The method of claim 10, wherein the electronic, portable device transmits the information indicative of the particular item of negotiable economic credit to the POS device without receiving an input from the user to select the particular item of negotiable economic credit to be applied to the transaction.

17. An article of manufacture including a non-transitory computer-readable medium having instructions stored thereon that are executable by a device to cause the device to perform operations comprising:

receiving a data structure corresponding to an account associated with the device, wherein the data structure encodes information indicative of a particular item of negotiable economic credit and further includes authentication information usable to authenticate the particular item of negotiable economic credit;

based on particular information indicating that a transaction has been initiated by a user for the device, sending the information indicative of the particular item of negotiable economic credit and the authentication information to a point-of-sale (POS) device, and instructing the POS device to apply the particular item of negotiable economic credit to the transaction, wherein the POS device is one of a plurality of POS devices located in different establishments; and based on receiving from the POS device an indication that the particular item of negotiable economic credit has been authenticated, displaying a message indicating that the particular item of negotiable economic credit has been removed from the account and applied to the transaction.

18. The article of manufacture of claim 17, wherein the operations further comprise:
scanning an image via an optical scanner;
decoding, from the image, information indicative of a request for issuing the data structure; and
transmitting the request to a computer system.

19. The article of manufacture of claim 17, wherein the operations further comprise determining whether the particular item of negotiable economic credit is applicable to reduce a price of the transaction.

20. The article of manufacture of claim 17, wherein the operations further comprise:
establishing, via a wireless controller included in the device, a communication channel with the POS device, wherein the indication that the particular item of negotiable economic credit has been authenticated is received from the POS device through the communication channel.

21. A system, comprising:
a first point-of-sale (POS) device;
a database system that, during operation, stores a plurality of data structures, wherein a given one of the plurality of data structures corresponds to an account of a user, encodes information uniquely indicative of a particular item of negotiable economic credit, and further encodes authentication information usable to authenticate the particular item of negotiable economic credit; and
a mobile device operable to wirelessly communicate with the database system and with a plurality of POS devices including the first POS device, wherein the plurality of POS devices are in different locations associated with different businesses, and wherein during operation, the mobile device is further operable to:
wirelessly transmit a request for the given data structure to the database system and receive the given data structure in response to the request;
detect that a transaction has been initiated by the user;
determine that the data structure corresponds to the transaction; and
wirelessly transmit the information uniquely indicative of the particular item of negotiable economic credit and the authentication information to the first POS device;

wherein upon receiving the information uniquely indicative of the particular item of negotiable economic credit and the authentication information, the first POS device is further operable to:
determine that the particular item of negotiable economic credit is applicable to the transaction;
using the authentication information, communicate with an authentication server to authenticate the particular item of negotiable economic credit;
upon authenticating the particular item of negotiable economic credit, apply the particular item of negotiable economic credit to the transaction;
upon applying the particular item of negotiable economic credit to the transaction:
instruct the authentication server to prevent the particular item of negotiable economic credit from subsequently being authenticated; and
wirelessly transmit a message to the mobile device indicating that the particular item of negotiable economic credit was successfully applied to the transaction.

* * * * *